(12) United States Patent
Pourreza et al.

(10) Patent No.: US 11,399,198 B1
(45) Date of Patent: Jul. 26, 2022

(54) LEARNED B-FRAME COMPRESSION

(71) Applicant: QUALCOMM Incorporated, San Diego, CA (US)

(72) Inventors: Reza Pourreza, San Diego, CA (US); Yang Yang, San Diego, CA (US); Amir Said, San Diego, CA (US); Yinhao Zhu, La Jolla, CA (US); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/188,830

(22) Filed: Mar. 1, 2021

(51) Int. Cl.
*H04N 19/172* (2014.01)
*H04N 19/577* (2014.01)
*H04N 19/42* (2014.01)

(52) U.S. Cl.
CPC ......... *H04N 19/577* (2014.11); *H04N 19/172* (2014.11); *H04N 19/42* (2014.11)

(58) Field of Classification Search
CPC ..... H04N 19/577; H04N 19/172; H04N 19/72
See application file for complete search history.

(56) References Cited

U.S. PATENT DOCUMENTS

| 2019/0138889 | A1* | 5/2019 | Jiang | G06T 7/251 |
|---|---|---|---|---|
| 2019/0246102 | A1* | 8/2019 | Cho | H04N 19/109 |
| 2021/0279840 | A1* | 9/2021 | Chi | G06N 3/08 |
| 2021/0281867 | A1* | 9/2021 | Golinski | G06N 3/0454 |
| 2021/0365707 | A1* | 11/2021 | Mao | H04N 5/232935 |

\* cited by examiner

*Primary Examiner* — Jessica M Prince
(74) *Attorney, Agent, or Firm* — Polsinelli LLP

(57) ABSTRACT

Techniques are described for learned bidirectional predicted frame (B-frame) coding. An example method can include receiving a residual associated with a frame of a current time step; determining first motion information for a first reference frame associated with a first time step and second motion information for a second reference frame associated with a second time step, wherein the current time step is after the first time step and before the second time step; determining third motion information for the frame based on the first motion information and second motion information; generating a predicted frame based on the third motion information, first reference frame and second reference frame; and generating, using the predicted frame and residual, a reconstructed B-frame for the current time step, the reconstructed B-frame representing the frame.

28 Claims, 12 Drawing Sheets

800

RECEIVE, FROM AN ENCODER PORTION OF A NEURAL NETWORK SYSTEM, A RESIDUAL ASSOCIATED WITH A CURRENT FRAME OF A CURRENT PROCESSING TIME STEP
802

↓

DETERMINE FIRST MOTION INFORMATION FOR A FIRST REFERENCE FRAME ASSOCIATED WITH A FIRST PROCESSING TIME STEP AND SECOND MOTION INFORMATION FOR A SECOND REFERENCE FRAME ASSOCIATED WITH A SECOND PROCESSING TIME STEP
804

↓

DETERMINE, USING A DECODER PORTION OF THE NEURAL NETWORK SYSTEM, THIRD MOTION INFORMATION FOR THE CURRENT FRAME BASED ON THE FIRST MOTION INFORMATION OF THE FIRST REFERENCE FRAME AND THE SECOND MOTION INFORMATION OF THE SECOND REFERENCE FRAME
806

↓

GENERATE, USING THE DECODER PORTION OF THE NEURAL NETWORK SYSTEM, A PREDICTED FRAME BASED ON THE THIRD MOTION INFORMATION OF THE CURRENT FRAME, THE FIRST REFERENCE FRAME AND THE SECOND REFERENCE FRAME
808

↓

GENERATE, USING THE PREDICTED FRAME AND THE RESIDUAL, A RECONSTRUCTED BIDIRECTIONAL PREDICTED FRAME (B-FRAME) FOR THE CURRENT PROCESSING TIME STEP
810

FIG. 8

LEARNED B-FRAME COMPRESSION

TECHNICAL FIELD

The present disclosure generally relates to video coding and, more specifically, to learned compression of bidirectional predicted frames (B-frames).

BACKGROUND

Many devices and systems allow video data to be processed and output for consumption. Digital video data includes large amounts of data to meet increasing demands in video quality, performance, and features. For example, consumers of video data typically desire high quality videos, with high fidelity, resolutions, frame rates, and the like. The large amounts of video data often needed to meet these demands places a significant burden on communication networks and devices that process and store the video data. Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

Disclosed are systems, methods, computer-readable media and techniques for learned video compression of frames using frame interpolation predictions. According to at least one example, a method is provided for processing video data. The method can include receiving, from an encoder portion of a neural network system, a residual associated with a frame of a current processing time step; determining first motion information for a first reference frame associated with a first processing time step and second motion information for a second reference frame associated with a second processing time step, wherein the current processing time step is after the first processing time step and before the second processing time step; determining, using a decoder portion of the neural network system, third motion information for the frame based on the first motion information of the first reference frame and the second motion information of the second reference frame; generating, using the decoder portion of the neural network system, a predicted frame based on the third motion information of the frame, the first reference frame and the second reference frame; and generating, using the predicted frame and the residual, a reconstructed bidirectional predicted frame (B-frame) for the current processing time step, the reconstructed B-frame representing the frame.

According to at least one example, a non-transitory computer-readable medium is provided for processing video data. The non-transitory computer-readable medium can include instructions stored thereon which, when executed by one or more processors, cause the one or more processors to receive, from an encoder portion of a neural network system, a residual associated with a frame of a current processing time step; determine first motion information for a first reference frame associated with a first processing time step and second motion information for a second reference frame associated with a second processing time step, wherein the current processing time step is after the first processing time step and before the second processing time step; determine, using a decoder portion of the neural network system, third motion information for the frame based on the first motion information of the first reference frame and the second motion information of the second reference frame; generate, using the decoder portion of the neural network system, a predicted frame based on the third motion information of the frame, the first reference frame and the second reference frame; and generate, using the predicted frame and the residual, a reconstructed bidirectional predicted frame (B-frame) for the current processing time step, the reconstructed B-frame representing the frame.

According to at least one example, an apparatus is provided for processing video data. The apparatus can include memory and one or more processors configured to receive, from an encoder portion of a neural network system, a residual associated with a frame of a current processing time step; determine first motion information for a first reference frame associated with a first processing time step and second motion information for a second reference frame associated with a second processing time step, wherein the current processing time step is after the first processing time step and before the second processing time step; determine, using a decoder portion of the neural network system, third motion information for the frame based on the first motion information of the first reference frame and the second motion information of the second reference frame; generate, using the decoder portion of the neural network system, a predicted frame based on the third motion information of the frame, the first reference frame and the second reference frame; and generate, using the predicted frame and the residual, a reconstructed bidirectional predicted frame (B-frame) for the current processing time step, the reconstructed B-frame representing the frame.

According to another example, an apparatus for processing video data can include means for receiving, from an encoder portion of a neural network system, a residual associated with a frame of a current processing time step; determining first motion information for a first reference frame associated with a first processing time step and second motion information for a second reference frame associated with a second processing time step, wherein the current processing time step is after the first processing time step and before the second processing time step; determining, using a decoder portion of the neural network system, third motion information for the frame based on the first motion information of the first reference frame and the second motion information of the second reference frame; generating, using the decoder portion of the neural network system, a predicted frame based on the third motion information of the frame, the first reference frame and the second reference frame; and generating, using the predicted frame and the residual, a reconstructed bidirectional predicted frame (B-frame) for the current processing time step, the reconstructed B-frame representing the frame.

In some aspects, the method, non-transitory computer-readable medium, and apparatuses described above can include training, for one or more training iterations, the neural network system using a loss function, the loss function determining a loss between one or more reconstructed B-frames and one or more frames represented by the one or more reconstructed B-frames.

In some examples, the first motion information can include a first two-dimensional (2D) optical flow map calculated from the current processing time step to the first reference frame. In some examples, the second motion information can include a second 2D optical flow map calculated from the current processing time step to the second reference frame. In some examples, the third motion information can include a three-dimensional (3D) optical flow map generated based on the first 2D optical flow map and the second 2D optical flow map.

In some cases, the first 2D optical flow map and the second 2D optical flow map can include spatial dimensions indicating vertical and horizontal displacements, and the 3D optical flow map can include spatial dimensions indicating estimated vertical and horizontal displacements and a frame dimension mapping each of the estimated vertical and horizontal displacements in the spatial dimensions to a corresponding one of the first reference frame and the second reference frame.

In some aspects, the method, non-transitory computer-readable medium, and apparatuses described above can include determining, using the decoder portion of the neural network system, forward motion information from the first reference frame to the second reference frame, and backward motion information from the second reference frame to the first reference frame; determining, using the decoder portion of the neural network system, the first 2D optical flow map based on the forward motion information and a value of an interval of the first processing time step and the second processing time step, the value of the interval corresponding to the current processing time step; and determining, using the decoder portion of the neural network system, the second 2D optical flow map based on the backward motion information and the value of the interval.

In some aspects, the method, non-transitory computer-readable medium, and apparatuses described above can include warping, using the 3D optical flow map, the first reference frame and the second reference frame to the current processing time step. In some examples, the predicted frame is generated based on the 3D optical flow map, the warped first reference frame and the warped second reference frame.

In some aspects, the method, non-transitory computer-readable medium, and apparatuses described above can include adjusting one or more motion values in at least one of the first 2D optical flow map and the second 2D optical flow map based on a detected non-linearity in the one or more motion values; and after adjusting the one or more values in at least one of the first 2D optical flow map and the second 2D optical flow map, merging the first 2D optical flow map and the second 2D optical flow map into the 3D optical flow map.

In some aspects, the method, non-transitory computer-readable medium, and apparatuses described above can include receiving, from the encoder portion of the neural network system, an encoded bitstream including the residual and contextual information extracted from image data associated with at least one of the frame, the first reference frame and the second reference frame; decoding, using the decoder portion of the neural network system, the encoded bitstream; and adjusting the one or more values in at least one of the first 2D optical flow map and the second 2D optical flow map. In some examples, the one or more values can be adjusted further based on the contextual information. In some examples, the contextual information can include an occlusion in the image data, one or more edges in the image data, and/or one or more features in the image data.

In some aspects, the method, non-transitory computer-readable medium, and apparatuses described above can include warping, using the first 2D optical flow map, the first reference frame to the current processing time step; and warping, using the second 2D optical flow map, the second reference frame to the current processing time step. In some examples, the 3D optical flow map is generated based on the first reference frame, the second reference frame, the warped first reference frame, the warped second reference frame, the first 2D optical flow map, and/or the second optical flow map.

In some cases, the first reference frame and the second reference frame can include an intra-coded frame (I-frame) and/or an additional B-frame.

In some aspects, the method, non-transitory computer-readable medium, and apparatuses described above can include receiving, from the encoder portion of the neural network system, an encoded bitstream including the residual; and decoding, using the decoder portion of the neural network system, the encoded bitstream.

In some aspects, the method, non-transitory computer-readable medium, and apparatuses described above can include generating, using the decoder portion of the neural network system, the predicted frame and the reconstructed B-frame without the frame and without motion information from the encoder portion of the neural network system.

In some aspects, the method, non-transitory computer-readable medium, and apparatuses described above can include determining, using the encoder portion of the neural network system, the first motion information for the first reference frame and the second motion information for the second reference frame; determining, using the encoder portion of the neural network system, the third motion information for the frame based on the first motion information of the first reference frame and the second motion information of the second reference frame; and generating, using the encoder portion of the neural network system, the predicted frame based on the third motion information of the frame, the first reference frame and the second reference frame.

In some aspects, the method, non-transitory computer-readable medium, and apparatuses described above can include generating, using the encoder portion of the neural network system, the residual based on the predicted frame and the frame; generating, using the encoder portion of the neural network system, an encoded bitstream including the residual; and transmitting, using the encoder portion of the neural network system, the encoded bitstream to the decoder portion of the neural network system.

In some aspects, the method, non-transitory computer-readable medium, and apparatuses described above can include determining, using the encoder portion of the neural network system, contextual information extracted from image data associated with at least one of the frame, the first reference frame and the second reference frame. In some examples, the encoded bitstream further comprises the contextual information.

In some aspects, the apparatus can include a mobile device, a wearable device, an extended reality device (e.g., a virtual reality (VR) device, an augmented reality (AR) device, or a mixed reality (MR) device), a personal computer, a laptop computer, a server computer, a television, a video game console, or other device. In some aspects, the apparatus comprises a mobile device (e.g., a mobile telephone or so-called "smart phone"). In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit the reconstructed video frame over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 8 is a flowchart illustrating an example process for learned coding of frames using blind interpolation, in accordance with some examples of the disclosure.

DETAILED DESCRIPTION

Figure 1:
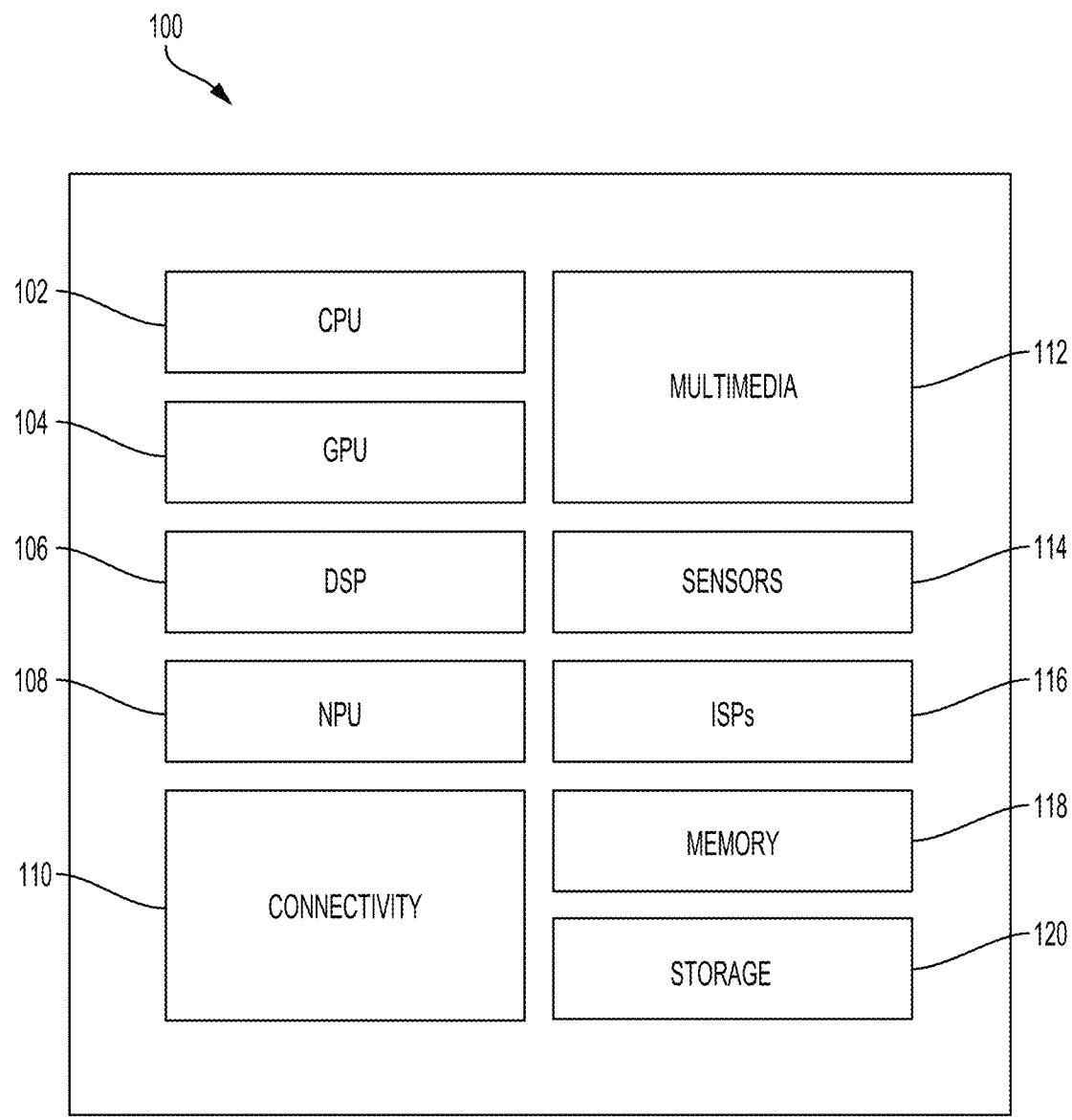
FIG. 1 illustrates an example image processing system which can implement the various techniques described herein, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data often needed to meet such demands can place a significant burden on communication networks as well devices that process and store the video data.

Various techniques can be used to code video data. Video coding can be performed according to a particular video coding standard and/or scheme. Example video coding standards include high-efficiency video coding (HEVC), advanced video coding (AVC), moving picture experts group (MPEG) coding, and versatile video coding (VVC). Video coding can use prediction methods such as inter-prediction or intra-prediction, which take advantage of redundancies present in video images or sequences. One goal of video coding techniques is to compress video data into a form that uses a lower bit rate, while avoiding or minimizing degradations in the video quality. As the demand for video services grows and new video services become available, coding techniques with better efficiency and performance are needed.

Disclosed are systems, methods, computer-readable media and techniques for learned video compression of frames using frame interpolation predictions, such as optical flow predictions. The techniques described herein can enable efficient, high quality video coding with lower resource demands, such as lower bandwidth demands. In some examples, the technologies described herein can efficiently and intelligently predict bidirectional predicted frames (B-frames) using motion information, such as optical flow, interpolated from reference frames. A B-frame can include a type of frame in compressed video data that is generated by referencing data from previous and future frames (e.g., frames preceding and following the B-frame) to determine changes between the previous and future frames. The B-frame can contain the data that changed from the previous frame and/or that differs from the future frame.

In some examples, the techniques described herein can reduce the amount of video data from a video encoder that a video decoder needs and/or uses to reconstruct video frames. For example, a video encoder can provide a residual frame to a video decoder. The video decoder can use reference frames to estimate an optical flow for a desired frame, and use the estimated optical flow and the residual frame to reconstruct the desired frame. The video decoder can reconstruct the desired frame without optical flow information from the video encoder, thus reducing the amount of data that the video encoder transmits to the video decoder and providing resource savings such as bandwidth. To estimate the optical flow, the video decoder can perform blind frame interpolation and/or context-aided frame interpolation, as further described herein.

The video encoder and the video decoder can use machine learning to process the video data. For example, the video encoder can use machine learning to generate a residual frame for the video decoder, and the video decoder can use machine learning to interpolate the optical flow, generate a predicted frame, and reconstruct the desired frame using the predicted frame and the residual frame. Machine learning (ML) is a subset of artificial intelligence (AI). ML systems include algorithms and statistical models that computer systems can use to perform various tasks by relying on patterns and inference. One example of a ML system is a neural network (also referred to as an artificial neural network), which can include an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing operations on the data. The results of the operations performed on the input data are selectively passed to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), multilayer perceptron (MLP) neural networks, among others. Convolutional neural networks may include collections of artificial neurons that each have a receptive field (e.g., a spatially localized region of an input space) and that collectively tile an input space. Convolutional neural networks have numerous applications. For example, CNNs can be broadly used in the area of pattern recognition and classification. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

FIG. 1 illustrates an example implementation of an image processing system 100, in accordance with some examples. The image processing system can include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, image data, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 and/or from a memory block 118.

The image processing system 100 can also include additional processing blocks for performing specific functions, such as a GPU 104; a DSP 106; a connectivity block 110, which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect image features. In some examples, the NPU 108 can be implemented in the CPU 102, DSP 106, and/or GPU 104. In some cases, the image processing system 100 may also include one or more sensor 114, one or more image signal processors (ISPs) 116, and/or storage 120.

In some examples, the image processing system 100 can implement an ARM instruction set architecture for one or more processors. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

The image processing system 100 and/or components thereof may be configured to perform video compression and/or decompression (also referred to as video encoding and/or decoding, collectively referred to as video coding) using techniques according to aspects of the present disclosure discussed herein. By using deep learning architectures and the techniques described herein to perform video compression and/or decompression, aspects of the present disclosure can increase the efficiency of video compression and/or decompression on a device and/or reduce associated resource requirements and/or usage. For example, a device using the video coding techniques described herein can compress video data more efficiently, can reduce the amount of data transmitted in compressed video data to a destination device, and the destination device can receive and decompress the compressed video data efficiently. In some examples, the deep learning architectures and techniques described herein can reduce the amount of data exchanged between coding devices or components, such as encoders and decoders, to code video content. The reduced amount of data transmitted for video coding can reduce latencies, increase performance, and reduce the cost or burden on computing resources such as, for example, bandwidth, memory, storage, power, compute, hardware, etc.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize features, such as edges, in the input stream. In another example, if presented with auditory data, the first layer may learn to recognize spectral power in specific frequencies. The second layer, taking the output of the first layer as input, may learn to recognize features, such as shapes for visual data or combinations of sounds for auditory data. For instance, higher layers may learn to represent complex shapes in visual data or words in auditory data. Still higher layers may learn to recognize common visual objects and/or spoken phrases.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
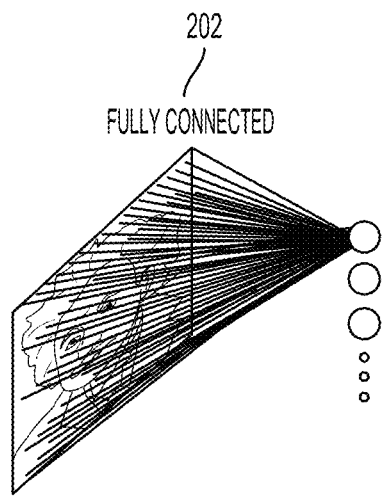
FIG. 2A illustrates an example of a fully connected neural network, in accordance with some examples of the disclosure.
Figure 2B:
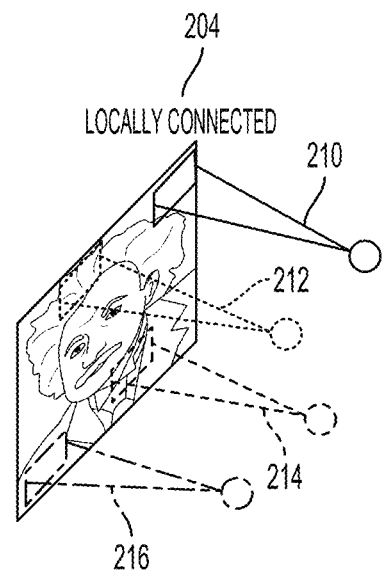
FIG. 2B illustrates an example of a locally connected neural network, in accordance with some examples of the disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
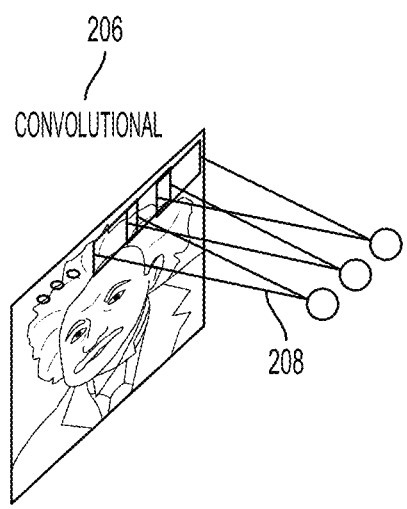
FIG. 2C illustrates an example of a convolutional neural network, in accordance with some examples of the disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
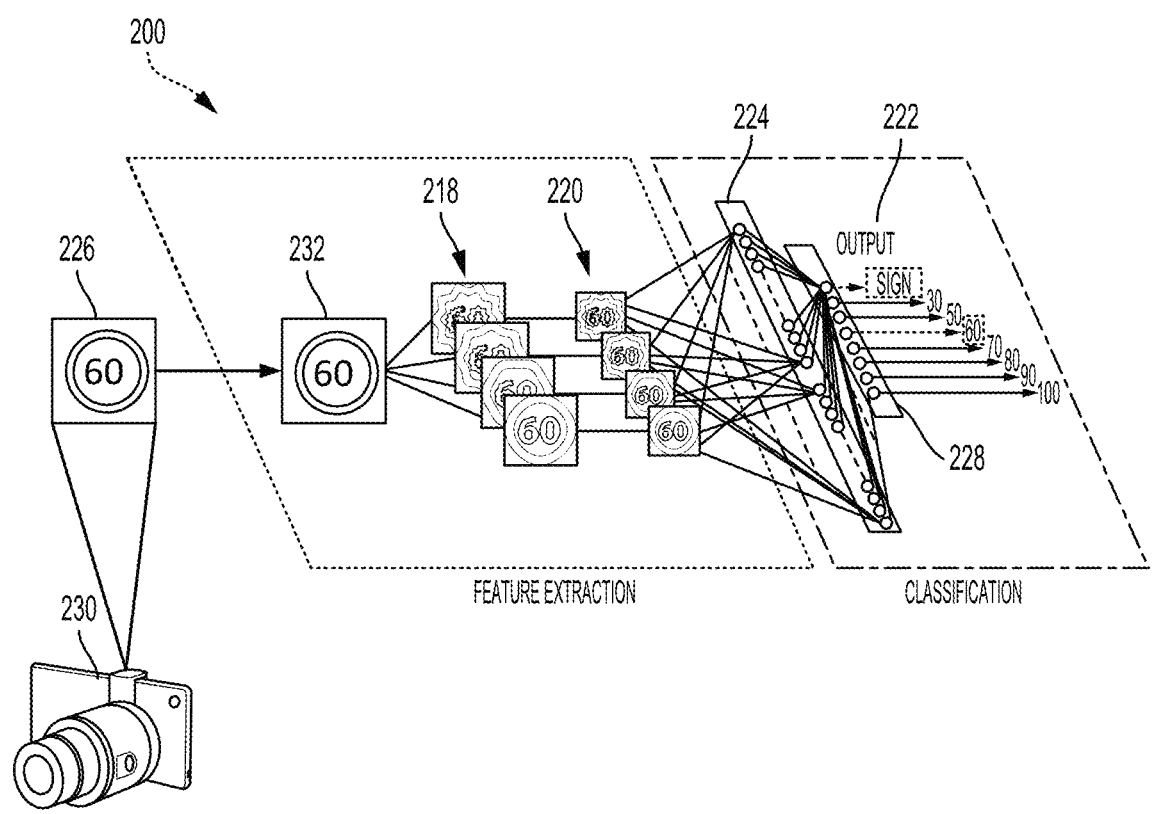
FIG. 2D illustrates a detailed example of a deep convolutional network (DCN) designed to recognize features from an image, in accordance with some examples of the disclosure.

One type of convolutional neural network is a deep convolutional network (DCN). FIG. 2D illustrates an example of a DCN 200 designed to recognize features from an image 226 input from an image capturing device 230, such as a camera or image sensor. In some examples, the DCN 200 of the current example may be trained to identify visual features in the image 226, such as one or more objects or signs in the image 226, for example.

In some examples, the DCN 200 may be trained with supervised learning. During training, the DCN 200 may be presented with an image, such as the image 226, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign", "60", and "100". A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30", "40", "50", "70", "80", "90", and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
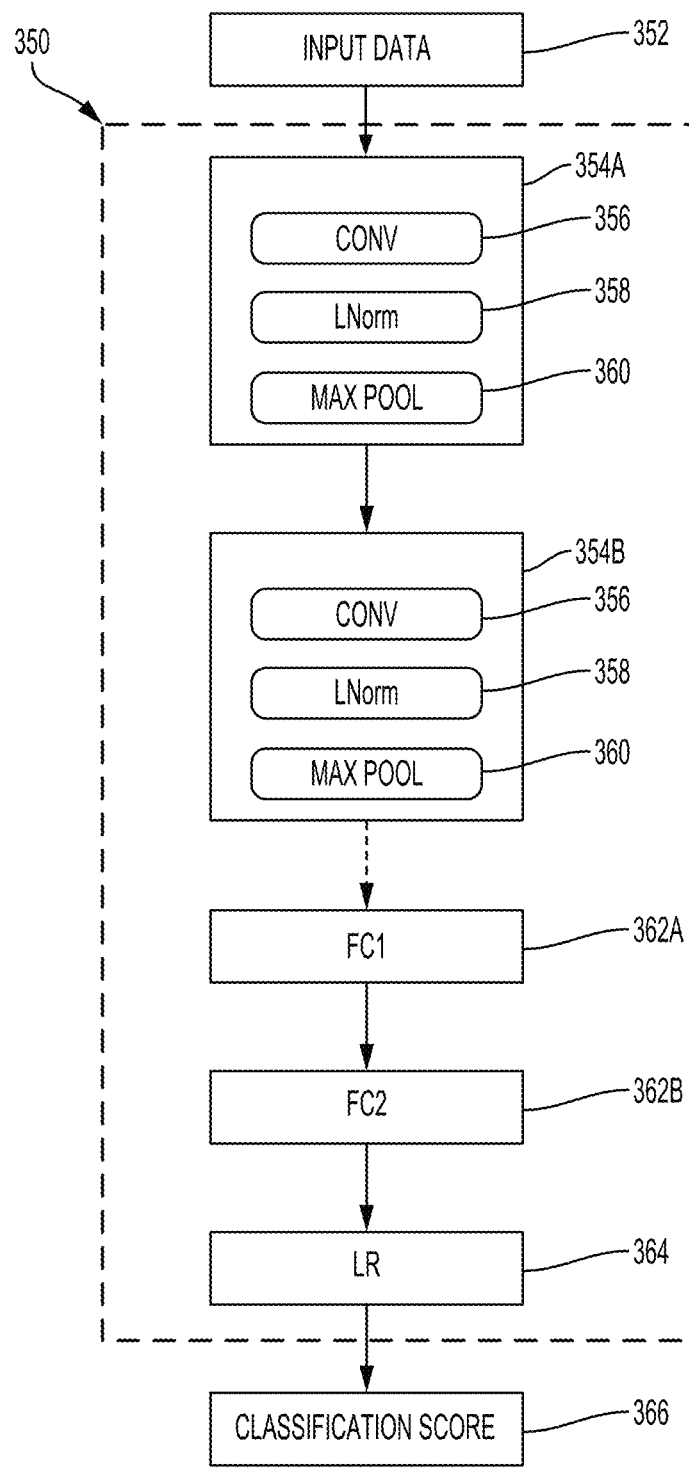
FIG. 3 is a block diagram illustrating another example DCN, in accordance with some examples of the disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preferences. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In some examples, the parallel filter banks may be loaded on the DSP 106 or an ISP 116 of an image processing system 100. The deep convolutional network 350 may access other processing blocks that may be present on the image processing system 100.

The deep convolutional network 350 may include one or more fully connected layers, such as layer 362A (labeled "FC1") and layer 362B (labeled "FC2"). The deep convolutional network 350 may include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As noted above, digital video data can include large amounts of data, which can place a significant burden on communication networks and devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Thus, it is desirable to reduce the amount of bandwidth used to deliver video content in these networks.

Because uncompressed video content can result in large files that may involve sizable memory for physical storage and considerable bandwidth for transmission, video coding techniques can be utilized to compress and decompress such video content, as further described herein. To reduce the size of video content—and thus the amount of storage involved to store video content and the amount of bandwidth involved in delivering video content—various video coding techniques can be performed according to a particular video coding standard and/or scheme, such as HEVC, AVC, MPEG, VVC, among others. Video coding can use prediction methods such as inter-prediction or intra-prediction, which take advantage of redundancies present in video images or sequences. One goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

An encoding device can encode video data according to a video coding standard to generate an encoded video bitstream. In some examples, an encoded video bitstream (or "video bitstream" or "bitstream") can include a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types can include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When inter-prediction applies, the prediction unit or prediction block is predicted by one reference picture, and therefore reference samples are from one reference region of one frame. A B slice (bi-directional predictive frames) is a slice of a picture that may be coded with intra-prediction and inter-prediction (e.g., either bi-prediction or uni-prediction). A prediction unit or prediction block of a B slice may be bi-directionally predicted from two reference pictures. Each picture can contribute a reference region and sample sets of the two reference regions can be weighted (e.g., with equal weights or with different weights) to produce the prediction signal of the bi-directional predicted block. As explained above, slices of one picture are independently coded. In some cases, a picture can be coded as just one slice.

After performing prediction using intra- and/or inter-prediction, the encoding device can perform transformation and quantization. For example, following prediction, the encoding device may calculate residual values corresponding to the PU. Residual values may include pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding standards (e.g., the HEVC video coding techniques described above) may be able to retain much of the information in raw video content and may be defined a priori based on signal processing and information theory concepts. However, while various compression algorithms may be applicable generally (e.g., to any type of video content), these video coding techniques may lack certain characteristics that are beneficial in a network-based environment or other type of environment. Methods (also referred to as processes), systems, apparatuses, and computer-readable media (collectively referred to as "systems and techniques") are described herein that perform learned video compression of frames using frame interpolation predictions, such as optical flow predictions. The systems and techniques described herein can enable efficient, high quality video coding with lower resource demands, such as lower bandwidth demands. In some examples, the systems and techniques described herein can efficiently and intelligently predict bidirectional predicted frames (B-frames) using motion information, such as optical flow, interpolated from reference frames.

In some examples, the systems and techniques described herein can reduce the amount of video data from a video encoder that a video decoder needs and/or uses to reconstruct video frames. For example, a video encoder can provide a residual frame to a video decoder. The video decoder can use reference frames to estimate an optical flow for a desired frame, and use the estimated optical flow and the residual frame to reconstruct the desired frame. The video decoder can reconstruct the desired frame without optical flow information from the video encoder, thus reducing the amount of data that the video encoder transmits to the video decoder and providing resource savings such as bandwidth. To estimate the optical flow, the video decoder can perform blind frame interpolation and/or context-aided frame interpolation, as further described herein.

In some examples, the systems and techniques described herein can utilize multiple neural network systems to compress and decompress video frames or images. For instance, one or more neural network systems can act as an image encoder (e.g., an image autoencoder) to compress a frame using optical flow information interpolated from reference frames. One or more neural network systems can be used for encoding and/or decoding frames using optical flow information interpolated from reference frames. The optical flow information can be used to determine the data of a current frame by describing how the pixels from reference frames move between the reference frames. The optical flow information can be used along with residual information to reconstruct the current frame.

While optical flow interpolation is used in various examples described herein, it should be noted that optical flow interpolation is merely used as an illustrative frame interpolation example. As one of ordinary skill in the art will recognize from the disclosure, the systems and techniques described herein can implement any other frame interpolation technique.

Figure 4A:
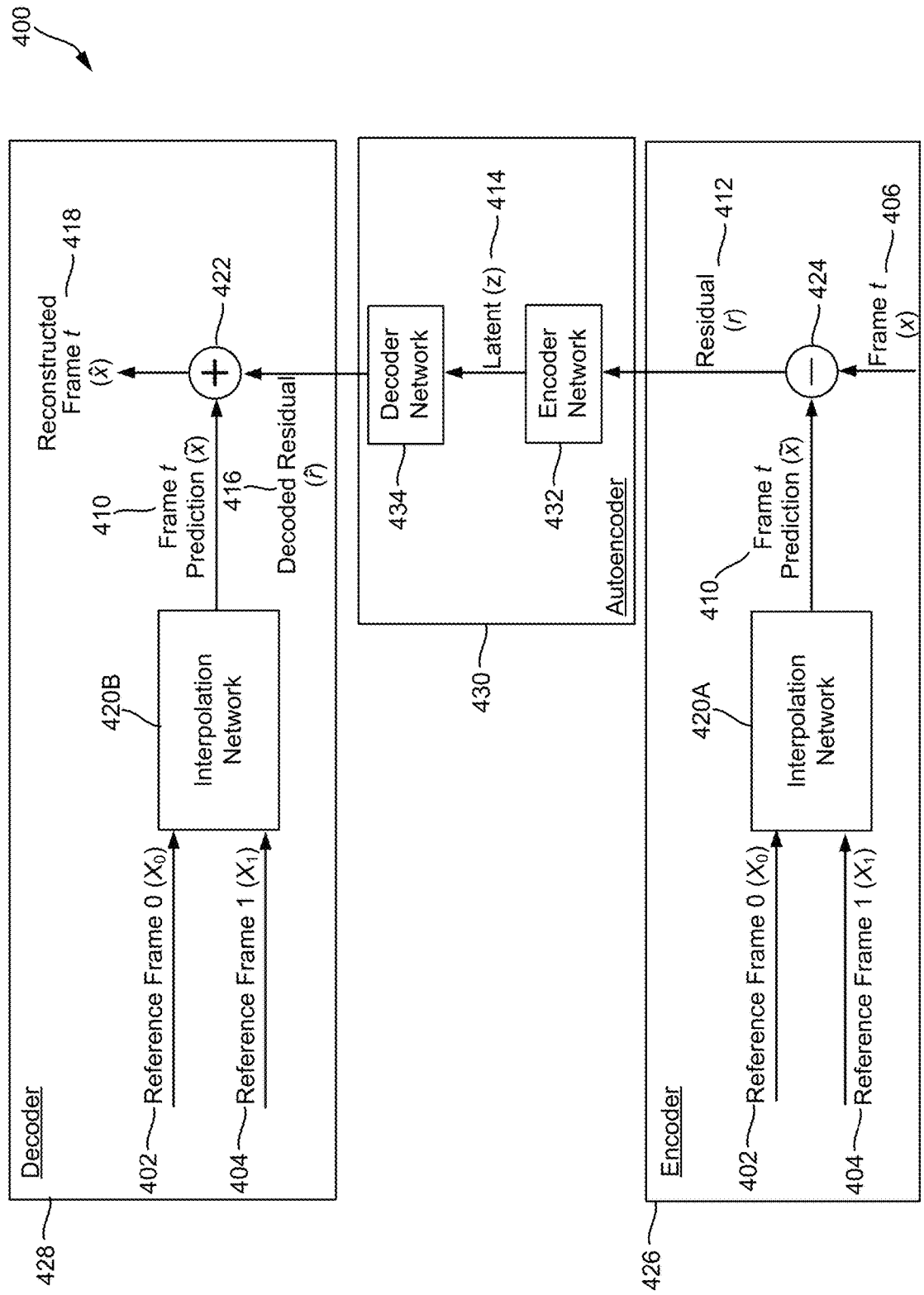
FIG. 4A is a diagram illustrating an example system configured to perform learned video coding using blind interpolation, in accordance with some examples of the disclosure.

FIG. 4A is a diagram illustrating an example system 400 configured to perform learned video coding using blind interpolation. In this example, the system 400 can include an encoder 426 including an interpolation network 420A, a decoder 428 including an interpolation network 420B, and an autoencoder 430. In some examples, the interpolation network 420A can be a local copy at the encoder 426 of the interpolation network 420B at the decoder 428. In some examples, the autoencoder 430 can be part of the decoder 428. In some examples, the autoencoder 430 can be part of the encoder 426. In other examples, the autoencoder 430 can be separate from the encoder 426 and the decoder 428. In some cases, the encoder 426, the decoder 428, and/or the autoencoder 430 can be implemented by a same computing device. In other cases, the encoder 426, the decoder 428, and/or the autoencoder 430 can be implemented by two or more separate computing devices.

In some examples, the encoder 426 can be part of or implemented by an encoding device, and the decoder 428 (and/or the autoencoder 430) can be part of or implemented by a destination device, such as a decoding device for example. The interpolation network 420A and the interpolation network 420B can each include one or more neural network systems, as further described below with respect to FIG. 5. For example, the interpolation network 420A and the interpolation network 420B can each include CNN networks configured to implement blind interpolation operations as described with respect to FIG. 5. The autoencoder 430 can include an encoder network 432 and a decoder network 434. In some examples, the autoencoder 430 can implement a CNN architecture, and the encoder network 432 and decoder network 434 can include neural networks.

At the encoder 426, the interpolation network 420A can use reference frames 402 (frame $x_0$) and 404 (frame $x_1$) to generate frame prediction 410 ($\hat{x}$) for a frame 406 (frame $x_t$). In some cases, the frame prediction 410 can include a frame predicted using the reference frame 402 and the reference frame 404. For example, the frame prediction 410 can provide a prediction of frame 406. The frame 406 ($x_t$) can be a frame temporally/sequentially after reference frame 402 and before reference frame 404. In some examples, the frame 406 ($x_t$) can be a current frame at time t, the reference frame 402 can be a past frame (e.g., temporally/sequentially before the current frame at time t) at time t−n and the reference frame 404 can be a future frame (e.g., temporally/sequentially after the current frame) at time t+m, where n and m can represent the same or different values.

Figure 7A:
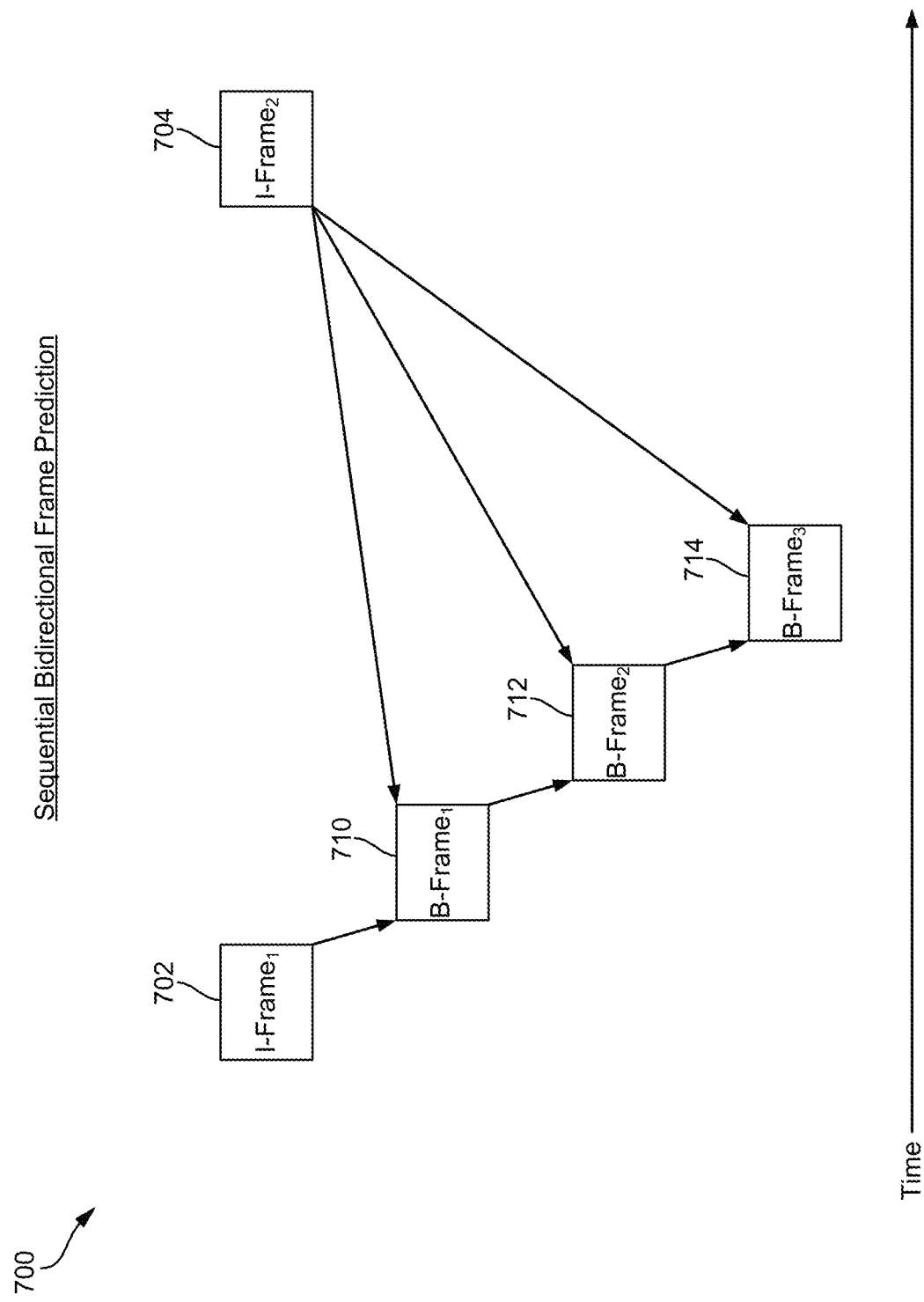
FIG. 7A is a diagram illustrating an example sequential scheme for bidirectional frame prediction, in accordance with some examples of the disclosure.
Figure 7B:
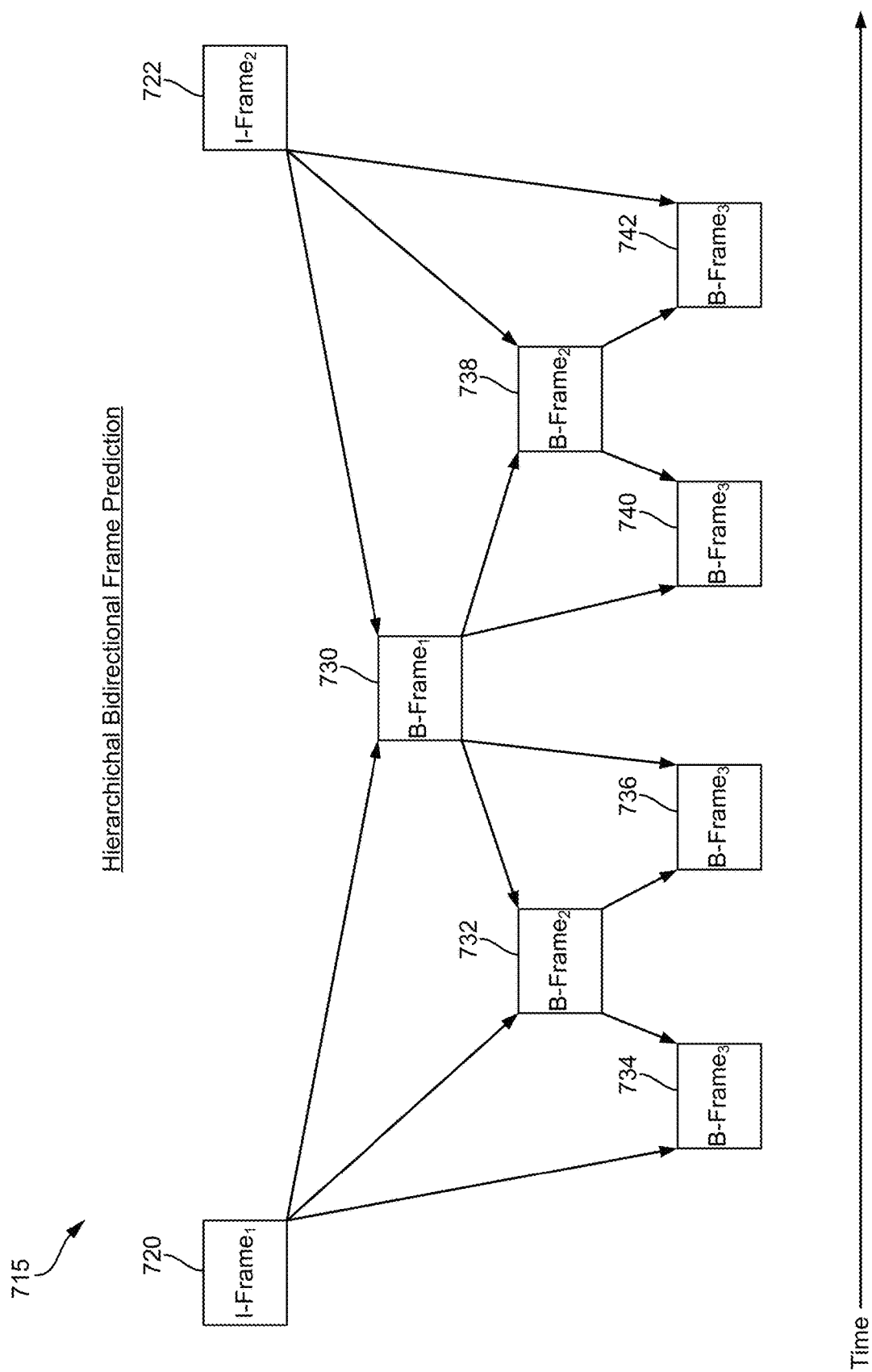
FIG. 7B is a diagram illustrating an example hierarchical scheme for bidirectional frame prediction, in accordance with some examples of the disclosure.

In some cases, the frame 406 can be a B-frame, and each of the reference frames 402 and 404 can be an I-frame or a B-frame. For example, reference frame 402 can be an I-frame or a B-frame and reference frame 404 can be an I-frame or a B-frame. In some cases, both the reference frames 402 and 404 can be a same type of frame, such as a B-frame or an I-frame. In other cases, reference frame 402 and reference frame 404 can be different types of frames. For example, reference frame 402 can be a B-frame and reference frame 404 can be an I-frame. In some cases, the reference frames 402 and 404 can be selected according to a sequential scheme 700 or a hierarchical scheme 715, as shown in FIGS. 7A and 7B and further described below.

To generate the frame prediction 410, the interpolation network 420A can perform frame interpolation to generate the frame prediction 410 given the reference frame 402 and the reference frame 404. The interpolation network 420A can perform any frame interpolation technique such as, for example and without limitation, frame interpolation based on optical flows, moving gradients methods, phase-based methods, kernel-based methods, and/or any other frame interpolation technique. In some examples, to generate the frame prediction 410, the interpolation network 420A can calculate motion estimation information (e.g., optical flow information), such as flow maps (also referred to as motion vector maps), for reference frame 402 and reference frame 404, and interpolate the motion estimation information (e.g., the flow maps) to determine a motion estimation (e.g., an optical flow) for a time t of the frame 406 associated with the frame prediction 410. The interpolation network 420A can use the interpolated motion estimation information (e.g., the interpolated optical flow) and the reference frames 402 and 404 to generate a warped frame representing the frame prediction 410.

In some examples, the interpolation network 420A can determine motion estimation information (e.g., optical flow information) on a pixel-by-pixel basis. For instance, the interpolation network 420A can map each pixel in the reference frame 402 (or a subset of pixels in the reference frame 402) to the location of the corresponding pixel in the reference frame 404 (or a corresponding subset of pixels in the reference frame 404), and vice versa (e.g., in both directions). The motion estimation information (e.g., optical flow information) for each pixel can include a vector indicating a movement of the pixel between the reference frames 402 and 404. In some examples, optical flow maps can be generated based on the optical flow vectors between the reference frames 402 and 404. The optical flow maps can include an optical flow vector for each pixel in a frame, where each vector indicates a movement of a pixel between the frames.

In one illustrative example, the optical flow vector for a pixel can be a displacement vector (e.g., indicating horizontal and vertical displacements, such as x- and y-displacements) showing the movement of a pixel from a first frame to a second frame. In some cases, the interpolation network 420A can calculate a 2D flow map (e.g., indicating horizontal and vertical displacements) for the reference frame 402 and a 2D flow map for the reference frame 404, and merge the 2D flow maps to generate a 3D flow map for the frame prediction 410. The 3D flow map can include a horizontal and a vertical dimension indicating horizontal and vertical displacements, and a frame dimension including a frame index identifying a frame to which the horizontal and vertical displacements apply. For example, if the frame dimension identifies reference frame 402, the horizontal and vertical dimensions can indicate the horizontal and vertical displacements for the pixels in the reference frame 402 (e.g., how much the pixels in reference frame 402 should be moved based on the optical flow information).

The interpolation network 420A can use the interpolated optical flow (e.g., the 3D flow map) to warp the reference frame 402 and the reference frame 404 to the specific time step (e.g., time t) of the frame 406 (e.g., frame $x_t$) associated with the frame prediction 410, and fuse the warped frames to generate the frame prediction 410 ($\tilde{x}$).

The frame prediction 410 can be subtracted 424 from the frame 406 to generate a residual 412 ($r$) which represents a difference between the frame prediction 410 and the frame 406. An encoder network 432 of the autoencoder 430 can use the residual 412 to generate a latent 414 ($z$) used to represent the residual 412. In some examples, the encoder network 432 can map the residual 412 to latent code. In some cases, the encoder network 432 can convert the latent 414 into a bit stream via entropy coding. In some examples, the encoder network 432 can also quantize the latent 414. The quantized latent 414 can include a quantized representation of the compressed frame 406 (e.g., a quantized representation of the residual 412). In some cases, the latent 414 can include neural network data (e.g., a node's activation map or feature map) that represents quantized codes.

The decoder network 434 of the autoencoder 430 can decode or reconstruct the latent 414 to generate a decoded residual 416. The decoded residual 416 can be used with the interpolation result (e.g., the frame prediction 410) from the interpolation network 420B to generate a reconstructed frame 418 (frame $\tilde{x}$) representing frame 406 at time t. For example, the interpolation network 420B at the decoder 428 can add 422 the frame prediction 410 to the decoded residual 416 to generate the reconstructed frame 418. The interpolation network 420B can use any frame interpolation technique to generate the frame prediction 410. In some cases, the interpolation network 420B can use the reference frame 402, the reference frame 404 and the interpolated motion estimation information (e.g., interpolated optical flow) to generate the frame prediction 410, as previously described with respect to the interpolation network 420A at the encoder 426.

The interpolation network 420B at the decoder 428 can generate the frame prediction 410 and the reconstructed frame 418 without motion estimation information (e.g., optical flow information) from the encoder 426 or a copy of the frame 406. Thus, the encoder 426 does not have to transmit motion estimation information or a copy of the frame 406 to the decoder 428 (e.g., to the interpolation network 420B) for the decoder 428 to generate the reconstructed frame 418. The encoder 426 may provide the residual for the decoder 428 without sending motion estimation information or the frame 406, and thus reduce the amount of data transmitted to the decoder 428 and the amount of bandwidth used by the system 400.

In some cases, the interpolation network 420A and/or the interpolation network 420B can be trained and optimized using one or more loss functions. In some examples, the interpolation network 420A and the interpolation network 420B can be trained end-to-end. In some cases, a loss function Loss can equal D+βR, where D is a distortion between a frame (e.g., frame 406) and its reconstructed frame (e.g., D(frame x, frame $\tilde{x}$)), β is a hyper parameter that controls a bitrate (bits per pixel), and R is the number of bits used to convert the residual (e.g., residual 416) to a compressed bitstream (e.g., latent 414). In some examples, the distortion D can be calculated based on a peak signal-to-noise ratio (PSNR), a structural similarity index measure (SSIM), a multiscale SSIM (MS-SSIM), and/or the like.

In some cases, an interpolation network can also use contextual information obtained for the frame 406 to calculate the interpolated motion estimation information (e.g., optical flow) used to generate the frame prediction (e.g., frame prediction 410). The interpolation network can receive the contextual information from a context network at the encoder.

Figure 4B:
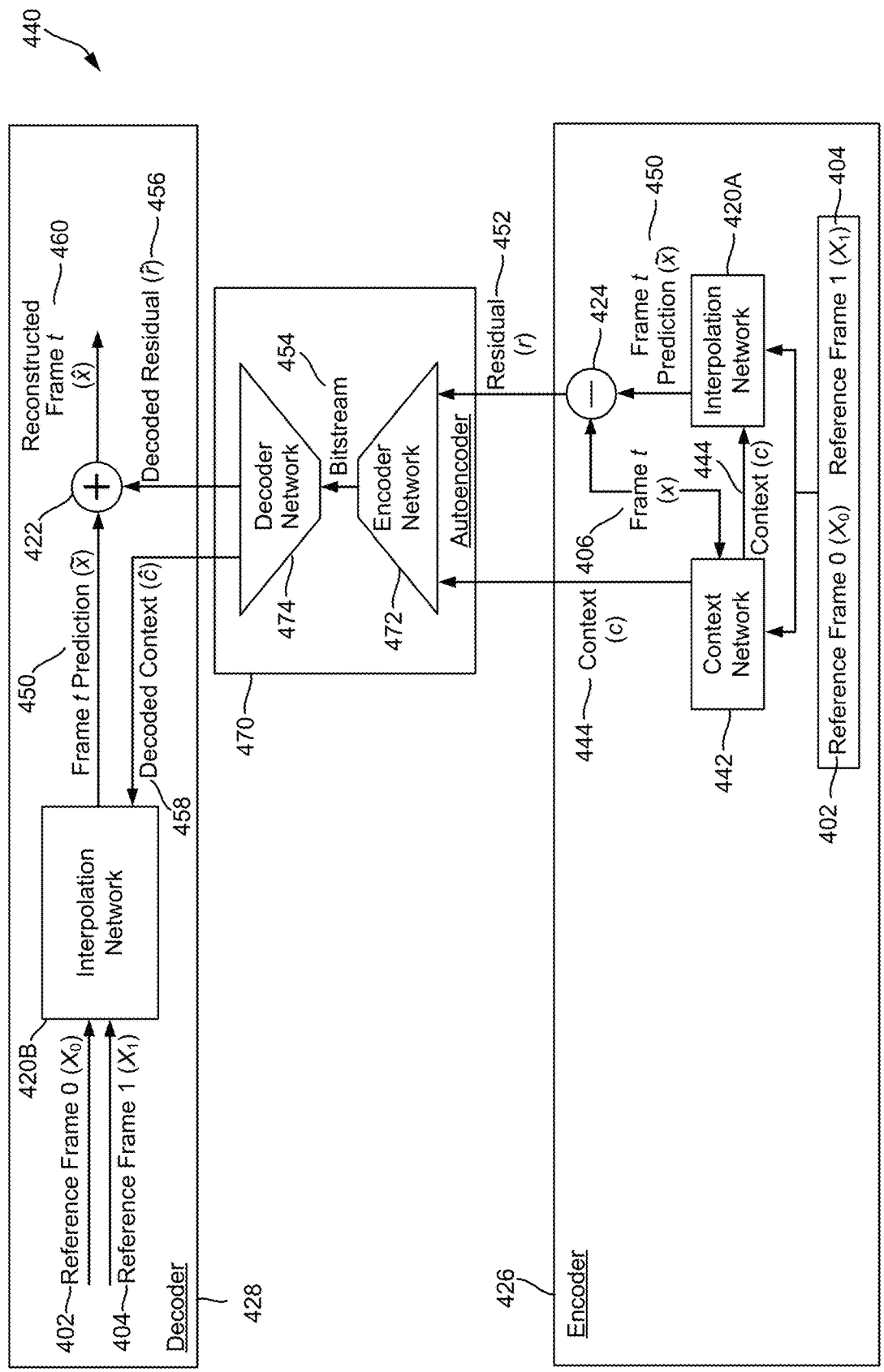
FIG. 4B is a diagram illustrating an example system configured to perform learned video coding with contextual information, in accordance with some examples of the disclosure.

FIG. 4B is a diagram illustrating an example system 440 configured to perform learned video coding using interpolation aided by contextual information. In this example, the encoder 426 can include a context network 442 in addition to the interpolation network 420A. The system 440 can also include the decoder 428 and an autoencoder 470. The autoencoder 470 can be a same autoencoder or separate autoencoder as the autoencoder 430 previously described. In some examples, the context network 442 can include one or more neural networks, such as one or more CNNs. In some cases, the context network 442 can include a U-Net architecture.

As shown, the context network 442 can use the reference frame 402, the reference frame 404, and the frame 406 to extract contextual information 444 ($c$) for the frame 406. The contextual information 444 can provide information about the frame 406 as compared to the reference frame 402 and the reference frame 404. For example, the contextual information 444 can identify one or more occluded areas in the frame 406, movements around edges in the frames 406, one or more features in frame 406, and/or any high level information about frame 406.

The interpolation network 420A can use the contextual information 444, along with the reference frame 402 and the reference frame 404, to calculate a frame prediction 450 for frame 406. The frame prediction 450 can be subtracted 424 from the frame 406 to generate a residual 452 ($r$) which represents a difference between the frame prediction 450 and the frame 406. In some examples, the interpolation network 420A or any other component can subtract 424 the frame prediction 450 from the frame 406 to determine the residual 452. In some examples, the interpolation network 420A can use the contextual information 444 to refine motion estimation information (e.g., optical flow information) calculated for the frame 406 by interpolating motion estimation information from the reference frame 402 and the reference frame 404. For example, the interpolation network 420A can use the contextual information 444 to refine a non-linearity of motion information calculated from the reference frame 402 and the reference frame 404.

In some cases, the contextual information 444 can allow the interpolation network 420A to reduce the amount of data (e.g., the bits) in the residual 452 and thus lower the bitrate (bits per pixel) transmitted to the decoder 428 and/or the interpolation network 420B at the decoder 428. For example, the context network 442 and the interpolation network 420A can be trained and optimized to reduce the amount of distortion (D) between the frame 406 and the reconstructed frame. Since the amount of residual and contextual information bits transmitted (e.g., the rate) by the interpolation network 420A to the decoder 428 can depend on the amount of distortion (D), by allowing the interpolation network 420A to reduce the residual bits, the contextual information 444 can allow the interpolation network 420A to reduce the rate (and/or the residual bits) transmitted to the decoder 428.

In some cases, the interpolation network 420A, the interpolation network 420B, and/or the context network 442 can be trained and optimized using one or more loss functions. In some examples, a loss function Loss can equal D+βR, where D is a distortion between a frame (e.g., frame 406) and its reconstructed frame (e.g., D(frame x, frame x̂)), β is a hyper parameter that controls a bitrate, and R is the number of bits used to convert the residual (e.g., residual 452) and/or the contextual information 444 to a compressed bitstream (e.g., bitstream 454). In some examples, the distortion D can be calculated based on PSNR, SSIM, MS-SSIM, and/or the like.

The encoder network 472 of the autoencoder 470 can encode the contextual information 444 and the residual 452 into bitstream 454. As previously noted, the autoencoder 470 can be a same autoencoder or separate autoencoder as the autoencoder 430 shown in FIG. 4A. In some examples, the bitstream 454 can include a compressed bitstream with compressed contextual information (e.g., compressed contextual information 444) and a compressed residual (e.g., compressed residual 452). The decoder network 474 of the autoencoder 470 can decode the bitstream 454 and obtain the decoded residual 456 and the decoded contextual information 458 from the bitstream 454 for generating the reconstructed frame 460 (frame x̂).

The autoencoder 470 can send the decoded contextual information 458 to the interpolation network 420B at the decoder 428, for use by the interpolation network 420B to generate a reconstructed frame 460 (frame x̂) representing frame 406 at time t. The frame prediction 450 and the decoded residual 456 can be added 422 to generate the reconstructed frame 460 (frame x̂). In some examples, the interpolation network 420B can use the reference frame 402, the reference frame 404 and the interpolated motion estimation information (e.g., interpolated optical flow) to generate the frame prediction 450, as previously described with respect to the interpolation network 420A at the encoder 426.

The interpolation network 420B at the decoder 428 can generate the frame prediction 450 and the reconstructed frame 460 without motion estimation information (e.g., optical flow information) from the encoder 426 or a copy of the frame 406. Thus, the encoder 426 does not have to transmit motion estimation information or a copy of the frame 406 to the decoder 428 (e.g., to the interpolation network 420B) for the decoder 428 to generate the reconstructed frame 460. The encoder 426 may provide the residual and contextual information for the decoder 428 without sending motion estimation information or the frame 406, and thus reduce the amount of data transmitted to the decoder 428 and the amount of bandwidth used by the system 440.

While FIGS. 4A and 4B are described with respect to using optical flow interpolation, it should be noted that optical flow interpolation is merely used herein as an illustrative example for explanation purposes. One of ordinary skill in the art will recognize that the system 400 in FIG. 4A and the system 440 in FIG. 4B can implement any other frame interpolation technique.

Figure 5:
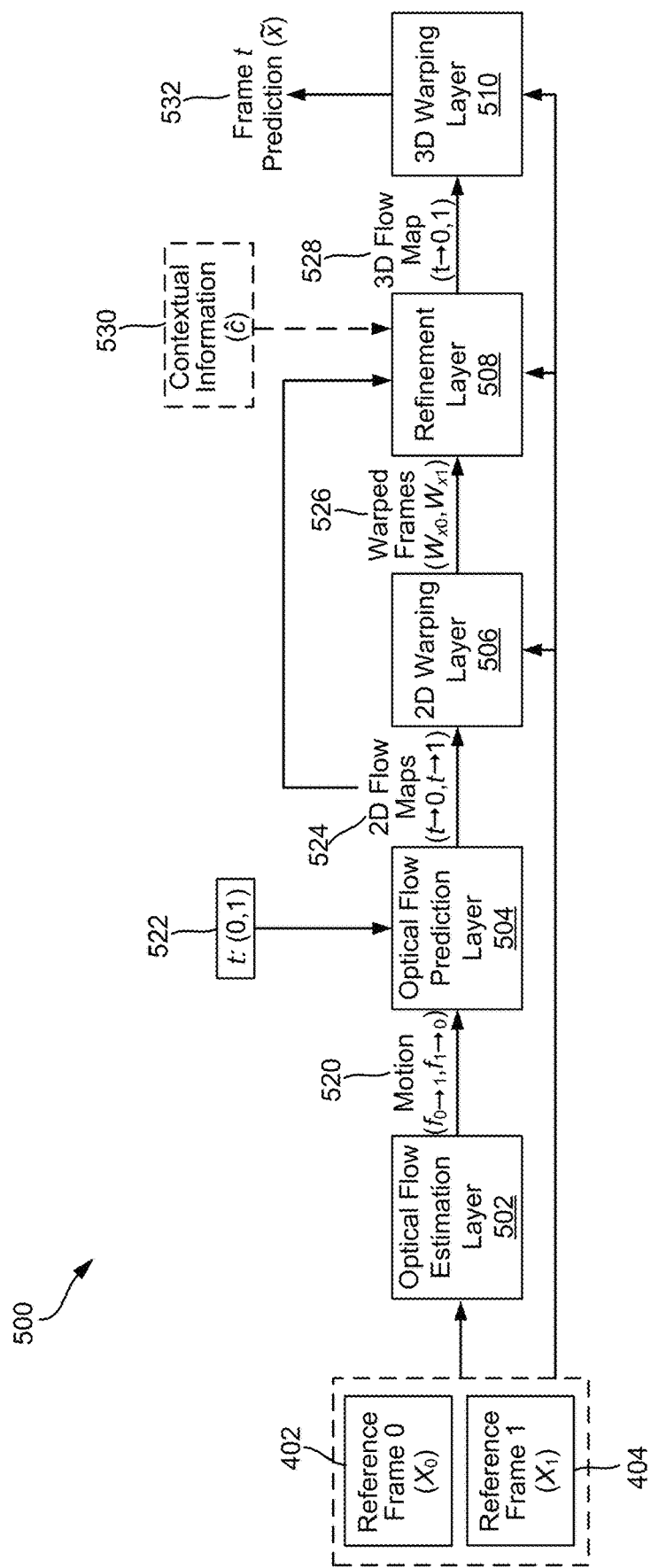
FIG. 5 is a diagram illustrating an example system flow of an example interpolation network, in accordance with some examples of the disclosure.

FIG. 5 is a diagram illustrating an example system flow 500 of an example interpolation network (e.g., interpolation network 420A, 402B). In this example, the interpolation network includes an optical flow estimation layer 502, an optical flow prediction layer 504, a 2D warping layer 506, a refinement layer 508 and a 3D warping layer 510.

In some examples, the optical flow estimation layer 502 can include a one or more neural networks. For example, the optical flow estimation layer 502 can be implemented using one or more optical flow estimation networks. The optical flow estimation layer 502 can use the reference frame 402 and the reference frame 404 to estimate bidirectional motion information 520 (e.g., forward optical flow and backward optical flow) for reference frame 402 and reference frame 404. The bidirectional motion information 520 can include an optical flow or optical flow map from reference frame 402 ($x_0$) to reference frame 404 ($x_1$) denoted as $f_{0 \to 1}$, and an optical flow or optical flow map from reference frame 404 ($x_1$) to reference frame 402 ($x_0$) denoted as $f_{1 \to 0}$.

For instance, the bidirectional motion information 520 can include an optical flow map $f_{0 \to 1}$ that maps the location of each pixel in the reference frame 402 (or a subset of pixels in the reference frame 402) to the location of the corresponding pixel in the reference frame 404 (or a corresponding subset of pixels in the reference frame 404), and an optical flow map $f_{1 \to 0}$ that maps the location of each pixel in the reference frame 404 (or a subset of pixels in the reference frame 404) to the location of the corresponding pixel in the reference frame 402 (or a corresponding subset of pixels in the reference frame 402). In some cases, the motion information 520 for each pixel can include a vector indicating a movement of the pixel between the reference frames 402 and 404. In some examples, optical flow maps $f_{0 \to 1}$ and $f_{1 \to 0}$ can be generated based on optical flow vectors between the reference frames 402 and 404. The optical flow maps can include an optical flow vector for each pixel in a frame, where each vector indicates a movement of a pixel between the frames.

The optical flow estimation layer 502 can provide the bidirectional motion information 520 (e.g., $f_{0 \to 1}$ and $f_{1 \to 0}$) to the optical flow prediction layer 504. The optical flow prediction layer 504 can obtain time information 522 indicating a time t in the interval 0 to 1 (e.g., t∈(0,1), where 0 represents a time step of reference frame 402, 1 represents a time step of reference frame 404, and time t corresponds to a time step of the fame to be coded (e.g., frame 406). The optical flow prediction layer 504 can use the bidirectional motion information 520 and the time information 522 to predict 2D optical flow maps 524. In some examples, the optical flow estimation layer 502 can interpolate the bidirectional motion information 520 (e.g., $f_{0 \to 1}$ and $f_{1 \to 0}$) for reference frame 402 and reference frame 404, to determine the optical flow at time t. In some cases, the optical flow at time t can be the linear interpolation between $f_{0 \to 1}$ and $f_{1 \to 0}$.

In some examples, the 2D optical flow maps 524 can include an optical flow map (e.g., $\tilde{f}_{t\to 0}^{2D}$) from time t to the reference frame 402 (e.g., to time step 0 of reference frame 402) and an optical flow map (e.g., $\tilde{f}_{t\to 1}^{2D}$) from time t to the reference frame 404 (e.g., to time step 1 of reference frame 404). For example, the 2D optical flow maps 524 can include a backward 2D flow map $\tilde{f}_{t\to 0}^{2D}$ with motion information from time t to a time series (e.g., time series 0 in the example shown in FIG. 5) of reference frame 402 and a forward 2D flow map $\tilde{f}_{t\to 1}^{2D}$ with motion information from time t to a time series (e.g., time series 1 in the example shown in FIG. 5) of reference frame 404.

In some examples, the optical flow prediction layer 504 can predict the 2D optical flows according to Equations 1 and 2 as follows:

$$\tilde{f}_{t\to 0}^{2D} = 1(1-t)tf_{0\to 1} + t^2 f_{1\to 0} \qquad \text{Equation (1)}$$

$$\tilde{f}_{t\to 1}^{2D} = 1(1-t)^2 f_{0\to 1} - t(1-t)f_{1\to 0} \qquad \text{Equation (2)}$$

In Equation 1 and Equation 2 above, t represents the time step of the frame being coded (e.g., frame 406) between a time step of reference frame 402 and a time step of reference frame 404 (e.g., a time step in the interval 0 to 1), $f_{0\to 1}$ represents an optical flow from reference frame 402 to reference frame 404, $f_{1\to 0}$ represents an optical flow from reference frame 404 to reference frame 402, $\tilde{f}_{t\to 0}^{2D}$ represents a 2D optical flow map identifying backward motion from t to the time step associated with the reference frame 402 (e.g., time step 0 in the example shown in FIG. 5), and $\tilde{f}_{t\to 1}^{2D}$ represents a 2D optical flow map identifying forward motion from t to the time step associated with the reference frame 404 (e.g., time step 1 in the example shown in FIG. 5).

The 2D warping layer 506 can obtain the 2D optical flow maps 524, the reference frame 402, and the reference frame 404 and generate warped frames 526. The warped frames 526 can include a warped frame ($W_{x0}$) corresponding to the reference frame 402 and generated by applying the 2D optical flow map $\tilde{f}_{t\to 0}^{2D}$ to reference frame 402, and a warped frame ($W_{x1}$) corresponding to the reference frame 404 and generated by applying the 2D optical flow map $\tilde{f}_{t\to 1}^{2D}$ to reference frame 404. The 2D warping layer 506 can implement one or more warp functions to warp the reference frame 402 to the time step t and warp the reference frame 404 to the time step t.

In some examples, the 2D warping layer 506 can use the 2D optical flow map $\tilde{f}_{t\to 0}^{2D}$ calculated for the reference frame 402 to move pixels in the reference frame 402 to respective locations corresponding to and/or relative to time t. Similarly, the 2D warping layer 506 can use the 2D optical flow map $\tilde{f}_{t\to 1}^{2D}$ calculated for the reference frame 404 to move pixels in the reference frame 404 to respective locations corresponding to and/or relative to time t. In some cases, the warped frames 526 can include a 2D frame for reference frame 402 that accounts for vertical and/or horizontal displacements of pixels (and/or pixel locations) at time t, and a 2D frame for reference frame 404 that accounts for vertical and/or horizontal displacements of pixels (and/or pixel locations) at time t.

The refinement layer 508 can obtain the 2D optical flow maps 524, the warped frames 526, and the reference frames 402 and 404, and perform refinement operations. In some cases, the refinement layer 508 can include one or more neural networks. For example, the refinement layer 508 can include one or more interpolation CNNs. In some examples, the refinement operations can include refining and/or correcting values in the 2D optical flow maps 524. For example, in some cases, some of the movement between time step 0 corresponding to reference frame 402 and time step 1 corresponding to reference frame 404 may not be linear. The refinement layer 508 can detect and correct such non-linear movement. The refinement layer 508 can generate refined 2D optical flows that account for such non-linearity. In other examples, the refinement layer 508 can refine or correct artifacts in any of the warped frames 526 (and/or any of the reference frames 402 and 404), refine or correct portions of any the warped frames 526 (and/or any of the reference frames 402 and 404) such as edges, make refinements or corrections to account for an occlusion(s) in any of the warped frames 526 (and/or any of the reference frames 402 and 404), and/or perform any other refinement of image data and/or optical flow information associated with the warped frames 526 (and/or the reference frames 402 and 404).

In some examples, the refinement operations can also include merging the 2D optical flow maps 524 into a 3D optical flow map 528 for the frame to be decoded (e.g., frame 406). For example, as previously noted, the 2D optical flow maps 524 can include a 2D optical flow map (e.g., $\tilde{f}_{t\to 0}^{2D}$) for the reference frame 402 and a 2D optical flow map (e.g., $\tilde{f}_{t\to 1}^{2D}$) for the reference frame 404. The refinement layer 508 can merge the 2D optical flow maps 524 (e.g., the 2D optical flow map $\tilde{f}_{t\to 0}^{2D}$ and the 2D optical flow map $\tilde{f}_{t\to 1}^{2D}$) to generate a 3D optical flow map 528. The 3D optical flow map 528 can map specific frames (e.g., reference frame 402, reference frame 404) to corresponding optical flow information. For example, the 3D optical flow map 528 can include two spatial dimensions (e.g., X and Y axes or vertical and horizontal dimensions), and a third dimension (e.g., a frame dimension) including frame information. The frame information in the third dimension can identify the frame (e.g., reference frame 402 or reference frame 404) to which the motion information (e.g., vertical and/or horizontal displacements) in the two spatial dimensions applies.

To illustrate, if the third dimension (e.g., the frame dimension) identifies reference frame 402, the corresponding values in the spatial dimensions (e.g., in the X and Y axes or vertical and horizontal dimensions) can indicate the horizontal and/or vertical displacements for the pixels in the reference frame 402 (e.g., how much the pixels in reference frame 402 should be moved based on the optical flow information in the spatial dimensions). Similarly, if the third dimension identifies reference frame 404, the corresponding values in the spatial dimensions can indicate the horizontal and/or vertical displacements for the pixels in the reference frame 404 (e.g., how much the pixels in reference frame 404 should be moved based on the optical flow information in the spatial dimensions).

In some cases, the refinement layer 508 can use the 2D optical flow maps 524 to merge the 2D optical flow maps 524 into the 3D optical flow map 528. In some examples, the refinement layer 508 can use the refined 2D optical flows generated by refining the 2D optical flow maps 524 to merge the 2D optical flow maps 524 into the 3D optical flow map 528. In some cases, the refinement layer 508 can use the reference frames 402 and 404, the warped frames 526, and/or the 2D optical flow maps 524 (or the refined 2D optical flows) as inputs to generate the 3D optical flow map 528.

In some cases, the refinement layer 508 can optionally use contextual information 530 as an additional input for the refinement operations. For example, the refinement layer 508 can receive contextual information generated by context network 442 shown in FIG. 4B, and use the contextual information to assist in refining or correcting the values in the 2D optical flow maps 524 and/or in merging the 2D optical flow maps 524 into a 3D optical flow map 528. In some cases, the refinement layer 508 can use the contextual information to detect and refine or correct non-linearities in the 2D optical flow maps 524, refine or correct artifacts in any of the warped frames 526 (and/or any of the reference frames 402 and 404), etc. In some examples, the contextual information 530 can include the contextual information 444 or the decoded contextual information 458 previously described with respect to FIG. 4B.

The 3D warping layer 510 can use the 3D optical flow map 528 and the reference frames 402 and 404 (and/or the warped frames 526) to generate a frame prediction 532 ($\tilde{x}$) for the frame corresponding to time step t (e.g., frame 406 or frame $x_t$). For example, the 3D warping layer 510 can use the 3D optical flow map 528 to warp the reference frames 402 and 404 (or the warped frames 526), and fuse the warped frames (e.g., the warped reference frames 402-404 or warped frames 526) to generate the frame prediction 532. In some cases, the 3D warping layer 510 can implement one or more warping functions.

In some cases, the optical flow estimation layer 502, the optical flow prediction layer 504, the 2D warping layer 506, the refinement layer 508 and/or the 3D warping layer 510 can be trained and/or optimized using one or more loss functions. In some cases, the optical flow estimation layer 502, the optical flow prediction layer 504, the 2D warping layer 506, the refinement layer 508 and the 3D warping layer 510 can be trained end-to-end using one or more loss functions.

In some examples, a loss function Loss can equal $D+\beta R$, where D is a distortion between a frame (e.g., frame 406) and its reconstructed frame (e.g., D(frame x, frame $\tilde{x}$)), $\beta$ is a hyper parameter that controls a bitrate, and R is the number of bits used to convert the residual (e.g., residual 412 or residual 452) and/or contextual information (e.g., contextual information 530) to a compressed bitstream. In some examples, the distortion D can be calculated based on PSNR, SSIM, MS-SSIM, and/or the like.

While FIG. 5 is described with reference to using optical flow interpolation, it should be noted that optical flow interpolation is merely used herein as an illustrative example for explanation purposes. One of ordinary skill in the art will recognize that any other frame interpolation technique can be used in the system flow 500 shown in FIG. 5 and escribed above.

Figure 6:
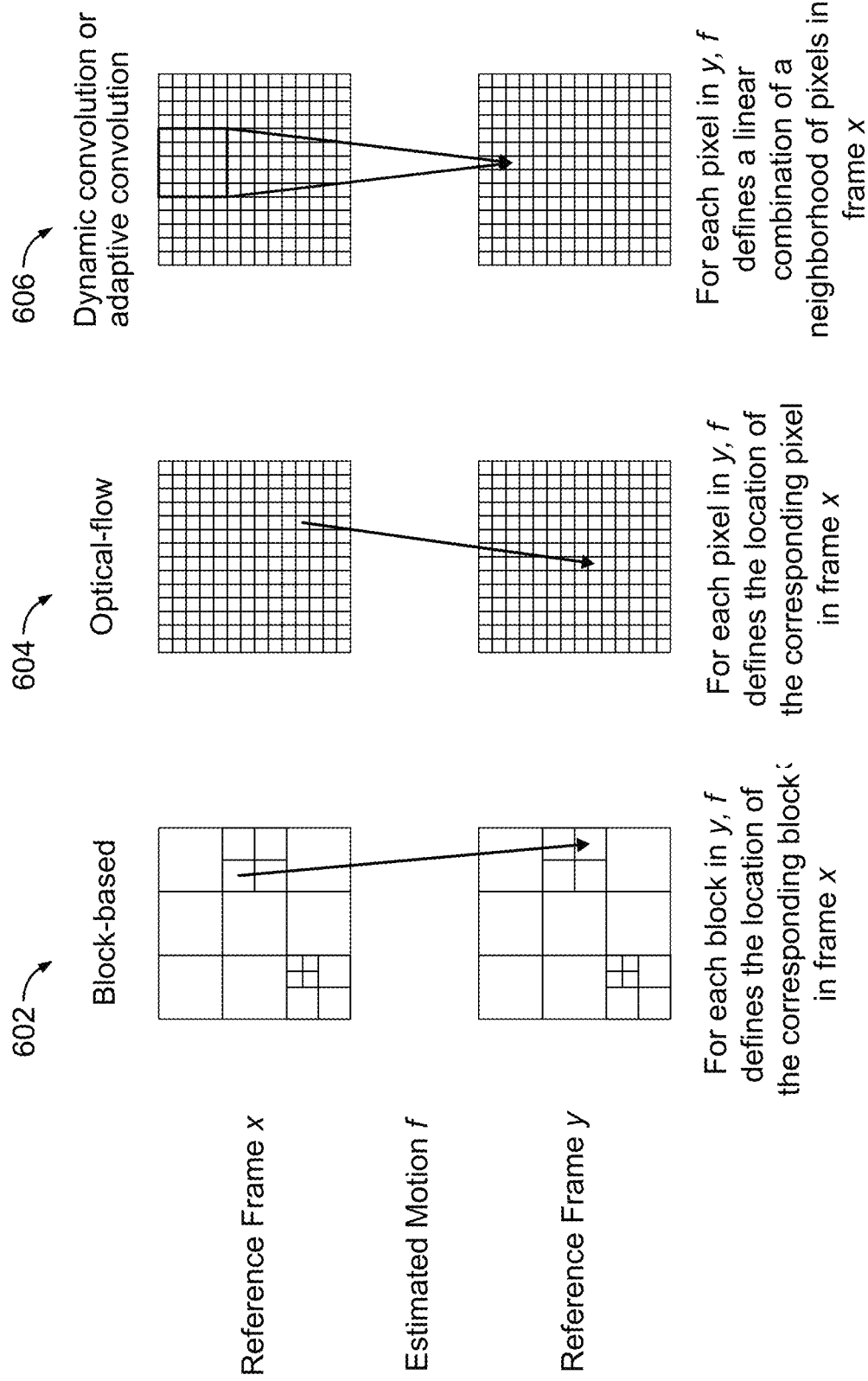
FIG. 6 is a diagram illustrating examples of motion estimation techniques, in accordance with some examples of the disclosure.

FIG. 6 is a diagram illustrating different types of motion estimations that can be performed to determine motion information between reference frames (e.g., from reference frame 402 to reference frame 404 or vice versa) and warp a reference frame. In FIG. 6, the term x denotes a reference frame from which motion can be estimated, the term f denotes a motion estimation, and the term y denotes a warped frame that can be computed as follows: y=f(x).

One type of motion estimation is a block-based motion estimation technique 602. The block-based motion estimation can be performed on a block-by-block basis. For instance, for each block in the frame y, the motion estimation f defines the location of the corresponding block in the frame x. In one illustrative example, the motion estimation f can include a motion vector that indicates the displacement (e.g., the horizontal and vertical displacement) of a block in the frame y relative to the corresponding block in the frame x. A block from the frame x can be determined to correspond to a block in the frame y by determining a similarity (e.g., a similarity in pixel values) between the blocks.

Another type of motion estimation that can performed is an optical flow motion estimation technique 604. The optical flow motion estimation can be performed on a pixel-by-pixel basis. For instance, for each pixel in the frame y, the motion estimation f defines the location of the corresponding pixel in the frame x. The motion estimation f for each pixel can include a vector indicates a movement of the pixel between the frames. In some cases, optical flow maps (also referred to as motion vector maps) can be generated based on the computation of the optical flow vectors between frames. The optical flow maps can include an optical flow vector for each pixel in a frame, where each vector indicates a movement of a pixel between the frames. In one illustrative example, the optical flow vector for a pixel can be a displacement vector (e.g., indicating horizontal and vertical displacements, such as x- and y-displacements) showing the movement of a pixel from a first frame to a second frame.

In some cases, the optical flow map can include vectors for less than all pixels in a frame. For instance, a dense optical flow can be computed between frames to generate optical flow vectors for each pixel in a frame, which can be included in a dense optical flow map. In some examples, each optical flow map can include a 2D vector field, with each vector being a displacement vector showing the movement of points from a first frame to a second frame.

As noted above, an optical flow vector or optical flow map can be computed between frames of a sequence of frames. Two frames can include two directly adjacent frames that are consecutively captured frames or two frames that are a certain distance apart (e.g., within two frames of one another, within three frames of one another, or any other suitable distance) in a sequence of frames. In one illustrative example, a pixel I(x, y, t) in the frame x can move by a distance ($\Delta x$, $\Delta y$) in the frame y.

Another type of motion estimation that can performed is a dynamic convolution (also referred to as adaptive convolution) motion estimation technique 606. The dynamic convolution motion estimation can be performed on a pixel-by-pixel basis. For instance, for each pixel in the frame y, the motion estimation f defines a linear combination of a neighborhood of pixels in the frame x. As shown in FIG. 6, for a pixel at a pixel location in the frame y, a kernel or matrix is defined around a neighborhood of pixels surrounding a pixel at a same pixel location in the frame x. The example dynamic convolution motion estimation in FIG. 6 is performed for a pixel at a location (2, 7) (corresponding to (row number, column number)) in the frame y, where the top-left pixel location in the frame y is at location (0, 0). The kernel is defined around a pixel at location (2, 7) in the frame x. For example, as shown, a kernel of size 5×5 is applied to a neighborhood of pixels surrounding the pixel at location (2, 7) in the frame x.

Each entry in the kernel or matrix can include a number (e.g., a set of 5×5 numbers in the example of FIG. 6). The set of numbers in the kernel can describe how to combine the pixels from the neighborhood of pixels that surround the pixel at the pixel location in the frame x corresponding to the same pixel location of the pixel that is being mapped and/or reconstructed in frame y.

FIG. 7A is a diagram illustrating an example sequential scheme 700 for bidirectional frame prediction. The sequential scheme 700 can be used to select reference frames for bidirectional coding of B-frames. In this example, I-frame 702 and I-frame 704 can be used as reference frames (e.g., reference frame 402 and reference frame 404) for interpolating motion information and predicting a B-frame (e.g., frame 406) as previously described.

B-frame 710 can then be used with I-frame 704 to interpolate motion information and predict B-frame 712. Similarly, B-frame 712 can then be used with I-frame 704 to interpolate motion information and predict B-frame 714. In this way, I-frame 702, B-frame 710, and B-frame 712 are sequentially used along with I-frame 704 to interpolate motion information and predict a frame.

FIG. 7B is a diagram illustrating an example hierarchical scheme 715 for bidirectional frame prediction. The hierarchical scheme 715 can be used to select B-frames for use as reference frames in bidirectional coding of B-frames. In this example, I-frame 720 and I-frame 722 can be used as reference frames (e.g., reference frame 402 and reference frame 404) for interpolating motion information and predicting B-frame 730.

B-frame 730 can then be used with I-frame 720 to interpolate motion information and predict B-frame 732 between B-frame 730 and I-frame 720. Similarly, B-frame 730 can be used with I-frame 722 to interpolate motion information and predict B-frame 738 between B-frame 730 and I-frame 722.

B-frame 732 can be used with I-frame 720 to interpolate motion information and predict B-frame 734 between B-frame 732 and I-frame 720. B-frame 732 can also be used with B-frame 730 to interpolate motion information and predict B-frame 736 between B-frame 732 and B-frame 730.

B-frame 738 can be used with B-frame 730 to interpolate motion information and predict B-frame 740 between B-frame 730 and B-frame 738. B-frame 738 can also be used with I-frame 722 to interpolate motion information and predict B-frame 742 between B-frame 738 and I-frame 722.

As illustrated in this example, a hierarchical order and/or sequence can be used to select the I-frames and/or B-frames as reference frames for bidirectional coding B-frames.

The sequential scheme 700 shown in FIG. 7A and the hierarchical scheme 715 shown in FIG. 7B can be used to select reference frames 402 and 404 to use for interpolating motion information for frame 406, predicting frame 406, reconstructing frame 406, and/or any other coding operations as described herein. It should be noted that the sequential scheme 700 shown in FIG. 7A and the hierarchical scheme 715 shown in FIG. 7B are merely illustrative examples and other schemes can also be used to implement the techniques described herein.

FIG. 8 is a flowchart illustrating an example process 800 for learned coding of frames, in accordance with some examples. At block 802, the process 800 can include receiving, from an encoder portion (e.g., encoder 426 and/or interpolation network 420A) of a neural network system (e.g., system 400 or system 440), a residual (e.g., residual 412 or residual 452) associated with a frame (e.g., frame 406) of a current processing time step (e.g., time t).

At block 804, the process 800 can include determining first motion information (e.g., motion information from the motion information 520, an optical flow map from 2D optical flows maps 524, etc.) for a first reference frame (e.g., reference frame 402) associated with a first processing time step (e.g., time step 0) and second motion information (e.g., motion information from the motion information 520, an optical flow map from 2D optical flow maps 524, etc.) for a second reference frame (e.g., reference frame 404) associated with a second processing time step (e.g., time step 1). The current processing time step can be after the first processing time step and before the second processing time step.

In some cases, motion information (and/or optical flow maps) can be generated using Equations 1 and 2, as previously explained. In some examples, the first reference frame and/or the second reference frame can be an intra-coded frame (I-frame) and/or an additional B-frame. In some cases, the first reference frame and the second reference frame can be a same type of frame (e.g., an I-frame or B-frame). In other cases, the first reference frame and the second reference frame can be a different type of frame (e.g., an I-frame and B-frame).

At block 806, the process 800 can include determining, using a decoder portion (e.g., decoder 428 and/or interpolation network 420B) of the neural network system, third motion information (e.g., 3D optical flow map 528) for the frame based on the first motion information of the first reference frame and the second motion information of the second reference frame. As noted above, in some examples, the first motion information can include the motion information 520, an optical flow map from 2D optical flows maps 524, and/or other information for the reference frame 402, and the second motion information can include the motion information 520, an optical flow map from 2D optical flow maps 524, and/or other information for the reference frame 404.

At block 808, the process 800 can include generating, using the decoder portion of the neural network system, a predicted frame (e.g., frame prediction 410, frame prediction 450, frame prediction 532) based on the third motion information of the frame, the first reference frame, and the second reference frame. At block 810, the process 800 can include generating, using the predicted frame and the residual, a reconstructed bidirectional predicted frame (B-frame) (e.g., reconstructed frame 418, reconstructed frame 460) for the current processing time step. The reconstructed B-frame can represent the frame.

In some examples, the first motion information can include a first 2D optical flow map (e.g., an optical flow map from 2D optical flow maps 524) calculated from the current processing time step to the first reference frame, and the second motion information can include a second 2D optical flow map (e.g., a different optical flow map from 2D optical flow maps 524) calculated from the current processing time step to the second reference frame. In some cases, the third motion information can include a 3D optical flow map (e.g., 3D optical flow map 528) generated based on the first 2D optical flow map and the second 2D optical flow map.

In some cases, the first 2D optical flow map and the second 2D optical flow map can include spatial dimensions (e.g., X and Y dimensions or horizontal and vertical dimensions) indicating vertical and horizontal displacements. In some cases, the 3D optical flow map can include spatial dimensions e.g., X and Y dimensions or horizontal and vertical dimensions) indicating estimated vertical and horizontal displacements and a frame dimension mapping each of the estimated vertical and horizontal displacements in the spatial dimensions to a corresponding one of the first reference frame and the second reference frame.

In some examples, the process 800 can include determining, using the decoder portion of the neural network system, forward motion information (e.g., forward motion information from the motion information 520) from the first reference frame to the second reference frame and backward motion information (e.g., backward motion information from the motion information 520) from the second reference frame to the first reference frame; determining, using the decoder portion of the neural network system, the first 2D optical flow map based on the forward motion information and a value of an interval (e.g., time information 522) of the first processing time step and the second processing time step; and determining, using the decoder portion of the neural network system, the second 2D optical flow map based on the backward motion information and the value of the interval. In some examples, the value of the interval can correspond to the current processing time step In some cases, the process 800 can include warping (e.g., via 3D warping layer 510), using the 3D optical flow map, the first reference frame and the second reference frame to the current processing time step. In some examples, the predicted frame can be generated based on the 3D optical flow map, the warped first reference frame and the warped second reference frame.

In some cases, the process 800 can include adjusting (e.g., refining via refinement layer 508) one or more motion values in the first 2D optical flow map and/or the second 2D optical flow map based on a detected non-linearity in the one or more motion values, and after adjusting the one or more values in the first 2D optical flow map and/or the second 2D optical flow map, merging (e.g., via the refinement layer 508) the first 2D optical flow map and the second 2D optical flow map into the 3D optical flow map.

In some cases, the process 800 can include receiving, from the encoder portion of the neural network system, an encoded bitstream (e.g., bitstream 454) including the residual and contextual information (e.g., contextual information 444, contextual information 530) extracted from image data associated with the frame, the first reference frame and/or the second reference frame (e.g., extracted from the frame, the first reference frame, and/or the second reference frame); decoding, using the decoder portion of the neural network system, the encoded bitstream; and adjusting the one or more values in the first 2D optical flow map and/or the second 2D optical flow map, the one or more values being adjusted further based on the contextual information. In some examples, the contextual information can include an occlusion in the image data, one or more edges in the image data, one or more features in the image data, and/or any other information about the frames.

In some examples, the process 800 can include warping (e.g., via 2D warping layer 506), using the first 2D optical flow map, the first reference frame to the current processing time step, and warping, using the second 2D optical flow map, the second reference frame to the current processing time step. In some cases, the 3D optical flow map is generated based on the first reference frame, the second reference frame, the warped first reference frame, the warped second reference frame, the first 2D optical flow map, and/or the second optical flow map.

In some examples, the process 800 can include receiving, from the encoder portion of the neural network system, an encoded bitstream including the residual, and decoding, using the decoder portion of the neural network system, the encoded bitstream.

In some examples, the process 800 can include generating, using the decoder portion of the neural network system, the predicted frame and the reconstructed B-frame without the frame and without motion information from the encoder portion of the neural network system.

In some examples, the process 800 can include determining, using the encoder portion of the neural network system, the first motion information for the first reference frame and the second motion information for the second reference frame; determining, using the encoder portion of the neural network system, the third motion information for the frame based on the first motion information of the first reference frame and the second motion information of the second reference frame; and generating, using the encoder portion of the neural network system, the predicted frame based on the third motion information of the frame, the first reference frame and the second reference frame.

In some examples, the process 800 can include generating, using the encoder portion of the neural network system, the residual based on the predicted frame and the frame; generating, using the encoder portion of the neural network system, an encoded bitstream comprising the residual; and transmitting, using the encoder portion of the neural network system, the encoded bitstream to the decoder portion of the neural network system.

In some examples, the process 800 can include determining, using the encoder portion of the neural network system, contextual information extracted from image data associated with the frame, the first reference frame and/or the second reference frame. In some cases, the encoded bitstream can further include the contextual information.

In some examples, the process 800 can include training, for one or more training iterations, the neural network system using a loss function (e.g., Loss). In some cases, the loss function can determine a loss between one or more reconstructed B-frames and one or more frames represented by the one or more reconstructed B-frames. In some examples, the first loss function can equal $D+\beta R$, as previously described.

Figure 9:
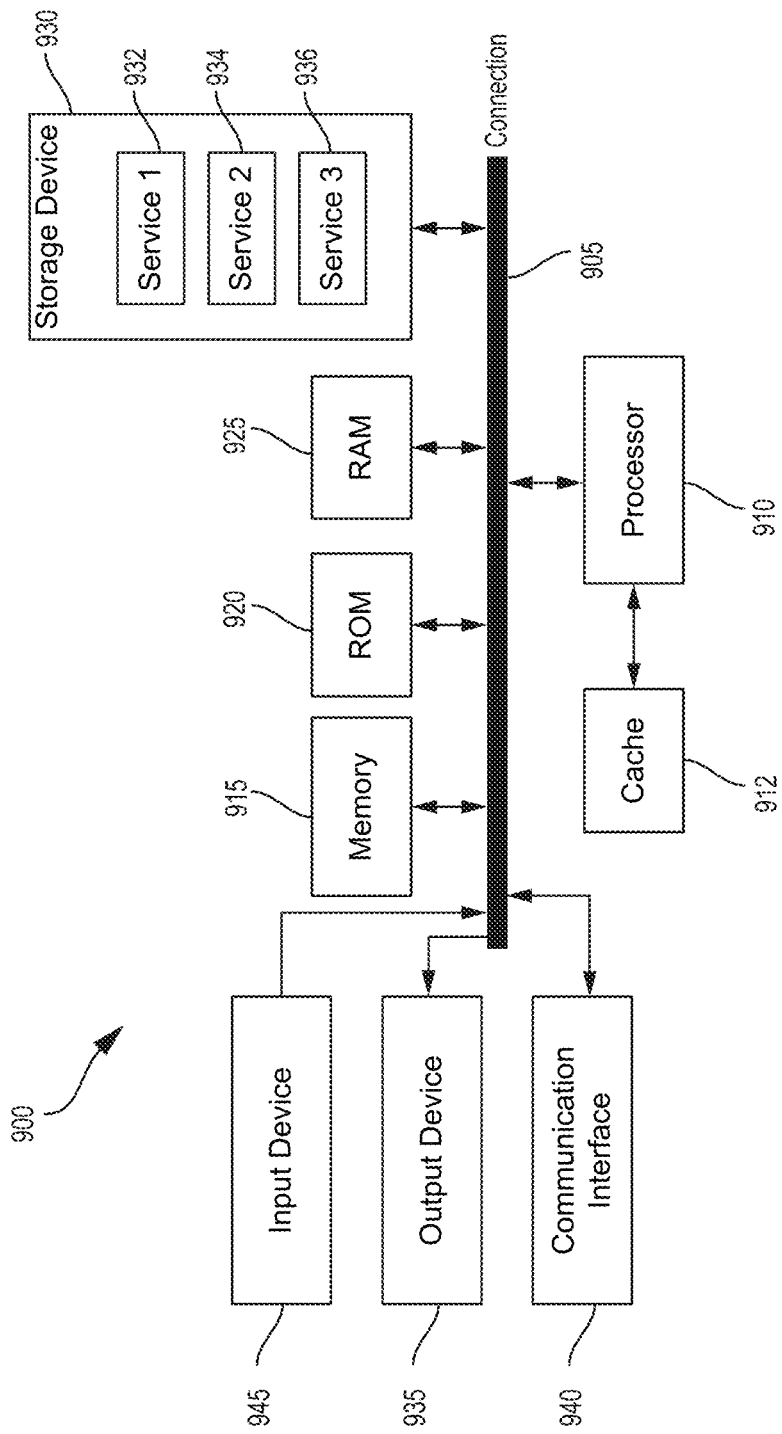
FIG. 9 illustrates an example computing device architecture of an example computing device which can implement the various techniques described herein.

In some examples, the processes described herein (e.g., process 800 and/or other process described herein) may be performed by a computing device or apparatus, such as a computing device having the computing device architecture 900 shown in FIG. 9. The computing device can include any suitable device, such as an autonomous vehicle computer, a robotic device, a mobile device (e.g., a mobile phone), a desktop computing device, a tablet computing device, a wearable device, a server device, a video game device, an extended reality device (e.g., a virtual reality (VR) device, an augmented reality (AR) device, or a mixed reality (MR) device), a camera device, a set-top box device, and/or any other computing device with the resource capabilities to perform the processes described herein, including process 800. In some examples, the computing device can include a mobile device, a wearable device, an XR device, a personal computer, a laptop computer, a video server, a television, a camera, a set-top box, a video game console, or other device. In some examples, the process 800 can be performed by a computing device with the computing device architecture 900 implementing the system 100, system 400 and/or the system 440 (using any of the architectures shown in FIG. 2A-FIG. 5 or any combination thereof).

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), application-specific integrated circuits (ASICs), field-programmable gate arrays (FPGAs), and/or other suitable electronic circuits), and/or can include and/or be implemented using computer software, firmware, or any combination thereof, to perform the various operations described herein.

Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 800) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement the various techniques described herein. In some examples, the computing device can include a mobile device, a wearable device, an XR device, a personal computer, a laptop computer, a video server, a video game console, a robotic device, a set-top box, a television, a camera, a server, or other device. For example, the computing device architecture 900 can implement the system 400 and/or the system 440 (including any one of the architectures shown in FIG. 2A-FIG. 5 or any combination thereof). The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

The term "device" is not limited to one or a specific number of physical objects (such as one smartphone, one controller, one processing system, and so on). As used herein, a device can include any electronic device with one or more parts that may implement at least some portions of this disclosure. While the description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the description and examples use the term "system" to describe various aspects of this disclosure, the term "system" is not limited to a specific configuration, type, or number of objects.

Specific details are provided in the description to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method comprising receiving, from an encoder portion of a neural network system, a residual associated with a frame of a current processing time step; determining first motion information for a first reference frame associated with a first processing time step and second motion information for a second reference frame associated with a second processing time step, wherein the current processing time step is after the first processing time step and before the second processing time step; determining, using a decoder portion of the neural network system, third motion information for the frame based on the first motion information of the first reference frame and the second motion information of the second reference frame; generating, using the decoder portion of the neural network system, a predicted frame based on the third motion information of the frame, the first reference frame and the second reference frame; and generating, using the predicted frame and the residual, a reconstructed bidirectional predicted frame (B-frame) for the current processing time step, the reconstructed B-frame representing the frame.

Aspect 2: The method of Aspect 1, wherein the first motion information comprises a first two-dimensional (2D) optical flow map calculated from the current processing time step to the first reference frame, wherein the second motion information comprises a second 2D optical flow map calculated from the current processing time step to the second reference frame, and wherein the third motion information comprises a three-dimensional (3D) optical flow map generated based on the first 2D optical flow map and the second 2D optical flow map.

Aspect 3: The method of Aspect 2, wherein the first 2D optical flow map and the second 2D optical flow map comprise spatial dimensions indicating vertical and horizontal displacements, and wherein the 3D optical flow map comprises spatial dimensions indicating estimated vertical and horizontal displacements and a frame dimension mapping each of the estimated vertical and horizontal displacements in the spatial dimensions to a corresponding one of the first reference frame and the second reference frame.

Aspect 4: The method of any of Aspects 2 to 3, further comprising: determining, using the decoder portion of the neural network system, forward motion information from the first reference frame to the second reference frame, and backward motion information from the second reference frame to the first reference frame; determining, using the decoder portion of the neural network system, the first 2D optical flow map based on the forward motion information and a value of an interval of the first processing time step and the second processing time step, the value of the interval corresponding to the current processing time step; and determining, using the decoder portion of the neural network system, the second 2D optical flow map based on the backward motion information and the value of the interval.

Aspect 5: The method of any of Aspects 2 to 4, further comprising: warping, using the 3D optical flow map, the first reference frame and the second reference frame to the current processing time step, wherein the predicted frame is generated based on the 3D optical flow map, the warped first reference frame and the warped second reference frame.

Aspect 6: The method of any of Aspects 2 to 5, further comprising: adjusting one or more motion values in at least one of the first 2D optical flow map and the second 2D optical flow map based on a detected non-linearity in the one or more motion values; and after adjusting the one or more values in at least one of the first 2D optical flow map and the second 2D optical flow map, merging the first 2D optical flow map and the second 2D optical flow map into the 3D optical flow map.

Aspect 7: The method of any of Aspects 2 to 6, further comprising: receiving, from the encoder portion of the neural network system, an encoded bitstream comprising the residual and contextual information extracted from image data associated with at least one of the frame, the first reference frame and the second reference frame; decoding, using the decoder portion of the neural network system, the encoded bitstream; and adjusting the one or more values in at least one of the first 2D optical flow map and the second 2D optical flow map, the one or more values being adjusted further based on the contextual information, the contextual information comprising at least one of an occlusion in the image data, one or more edges in the image data, and one or more features in the image data.

Aspect 8: The method of any of Aspects 2 to 7, further comprising: warping, using the first 2D optical flow map, the first reference frame to the current processing time step; and warping, using the second 2D optical flow map, the second reference frame to the current processing time step, wherein the 3D optical flow map is generated based on at least one of the first reference frame, the second reference frame, the warped first reference frame, the warped second reference frame, the first 2D optical flow map, and the second optical flow map.

Aspect 9: The method of any of Aspects 1 to 8, wherein the first reference frame and the second reference frame comprise at least one of an intra-coded frame (I-frame) and an additional B-frame.

Aspect 10: The method of any of Aspects 1 to 9, further comprising: receiving, from the encoder portion of the neural network system, an encoded bitstream comprising the residual; and decoding, using the decoder portion of the neural network system, the encoded bitstream.

Aspect 11: The method of any of Aspects 1 to 10, further comprising: generating, using the decoder portion of the neural network system, the predicted frame and the reconstructed B-frame without the frame and without motion information from the encoder portion of the neural network system.

Aspect 12: The method of any of Aspects 1 to 11, further comprising: determining, using the encoder portion of the neural network system, the first motion information for the first reference frame and the second motion information for the second reference frame; determining, using the encoder portion of the neural network system, the third motion information for the frame based on the first motion information of the first reference frame and the second motion information of the second reference frame; and generating, using the encoder portion of the neural network system, the predicted frame based on the third motion information of the frame, the first reference frame and the second reference frame.

Aspect 13: The method of any of Aspects 1 to 12, further comprising: generating, using the encoder portion of the neural network system, the residual based on the predicted frame and the frame; generating, using the encoder portion of the neural network system, an encoded bitstream comprising the residual; and transmitting, using the encoder portion of the neural network system, the encoded bitstream to the decoder portion of the neural network system.

Aspect 14: The method of any of Aspects 1 to 13, further comprising: determining, using the encoder portion of the neural network system, contextual information extracted from image data associated with at least one of the frame, the first reference frame and the second reference frame, wherein the encoded bitstream further comprises the contextual information.

Aspect 15: The method of any of Aspects 1 to 14, further comprising: training, for one or more training iterations, the neural network system using a loss function, the loss function determining a loss between one or more reconstructed B-frames and one or more frames represented by the one or more reconstructed B-frames.

Aspect 16: An apparatus comprising memory and one or more processors coupled to the memory and configured to: receive, from an encoder portion of a neural network system, a residual associated with a frame of a current processing time step; determine first motion information for a first reference frame associated with a first processing time step and second motion information for a second reference frame associated with a second processing time step, wherein the current processing time step is after the first processing time step and before the second processing time step; determine, using a decoder portion of the neural network system, third motion information for the frame based on the first motion information of the first reference frame and the second motion information of the second reference frame; generate, using the decoder portion of the neural network system, a predicted frame based on the third motion information of the frame, the first reference frame and the second reference frame; and generate, using the predicted frame and the residual, a reconstructed bidirectional predicted frame (B-frame) for the current processing time step, the reconstructed B-frame representing the frame.

Aspect 17: The apparatus of Aspect 16, wherein the first motion information comprises a first two-dimensional (2D) optical flow map calculated from the current processing time step to the first reference frame, wherein the second motion information comprises a second 2D optical flow map calculated from the current processing time step to the second reference frame, and wherein the third motion information comprises a three-dimensional (3D) optical flow map generated based on the first 2D optical flow map and the second 2D optical flow map.

Aspect 18: The apparatus of Aspect 17, wherein the first 2D optical flow map and the second 2D optical flow map comprise spatial dimensions indicating vertical and horizontal displacements, and wherein the 3D optical flow map comprises spatial dimensions indicating estimated vertical and horizontal displacements and a frame dimension mapping each of the estimated vertical and horizontal displacements in the spatial dimensions to a corresponding one of the first reference frame and the second reference frame.

Aspect 19: The apparatus of any of Aspects 17 to 18, wherein the one or more processors are configured to: determine, using the decoder portion of the neural network system, forward motion information from the first reference frame to the second reference frame, and backward motion information from the second reference frame to the first reference frame; determine, using the decoder portion of the neural network system, the first 2D optical flow map based on the forward motion information and a value of an interval of the first processing time step and the second processing time step, the value of the interval corresponding to the current processing time step; and determine, using the decoder portion of the neural network system, the second 2D optical flow map based on the backward motion information and the value of the interval.

Aspect 20: The apparatus of any of Aspects 17 to 19, wherein the one or more processors are configured to: warp, using the 3D optical flow map, the first reference frame and the second reference frame to the current processing time step, wherein the predicted frame is generated based on the 3D optical flow map, the warped first reference frame and the warped second reference frame.

Aspect 21: The apparatus of any of Aspects 17 to 20, wherein the one or more processors are configured to: adjust one or more motion values in at least one of the first 2D optical flow map and the second 2D optical flow map based on a detected non-linearity in the one or more motion values; and after adjusting the one or more values in at least one of the first 2D optical flow map and the second 2D optical flow map, merge the first 2D optical flow map and the second 2D optical flow map into the 3D optical flow map.

Aspect 22: The apparatus of any of Aspects 17 to 21, wherein the one or more processors are configured to: receive, from the encoder portion of the neural network system, an encoded bitstream comprising the residual and contextual information extracted from image data associated with at least one of the frame, the first reference frame and the second reference frame; decode, using the decoder portion of the neural network system, the encoded bitstream; and adjust the one or more values in at least one of the first 2D optical flow map and the second 2D optical flow map, the one or more values being adjusted further based on the contextual information, the contextual information comprising at least one of an occlusion in the image data, one or more edges in the image data, and one or more features in the image data.

Aspect 23: The apparatus of any of Aspects 17 to 22, wherein the one or more processors are configured to: warp, using the first 2D optical flow map, the first reference frame to the current processing time step; and warp, using the second 2D optical flow map, the second reference frame to the current processing time step, wherein the 3D optical flow map is generated based on at least one of the first reference frame, the second reference frame, the warped first reference frame, the warped second reference frame, the first 2D optical flow map, and the second optical flow map.

Aspect 24: The apparatus of any of Aspects 16 to 23, wherein the first reference frame and the second reference frame comprise at least one of an intra-coded frame (I-frame) and an additional B-frame.

Aspect 25: The apparatus of any of Aspects 16 to 24, wherein the one or more processors are configured to: receive, from the encoder portion of the neural network system, an encoded bitstream comprising the residual; and decode, using the decoder portion of the neural network system, the encoded bitstream.

Aspect 26: The apparatus of any of Aspects 16 to 25, wherein the one or more processors are configured to: generate, using the decoder portion of the neural network system, the predicted frame and the reconstructed B-frame without the frame and without motion information from the encoder portion of the neural network system.

Aspect 27: The apparatus of any of Aspects 16 to 26, wherein the one or more processors are configured to: determine, using the encoder portion of the neural network system, the first motion information for the first reference frame and the second motion information for the second reference frame; determine, using the encoder portion of the neural network system, the third motion information for the frame based on the first motion information of the first reference frame and the second motion information of the second reference frame; and generate, using the encoder portion of the neural network system, the predicted frame based on the third motion information of the frame, the first reference frame and the second reference frame.

Aspect 28: The apparatus of any of Aspects 16 to 27, wherein the one or more processors are configured to: generate, using the encoder portion of the neural network system, the residual based on the predicted frame and the frame; generate, using the encoder portion of the neural network system, an encoded bitstream comprising the residual; and transmit, using the encoder portion of the neural network system, the encoded bitstream to the decoder portion of the neural network system.

Aspect 29: The apparatus of any of Aspects 16 to 28, wherein the one or more processors are configured to: determine, using the encoder portion of the neural network system, contextual information extracted from image data associated with at least one of the frame, the first reference frame and the second reference frame, wherein the encoded bitstream further comprises the contextual information.

Aspect 30: The apparatus of any of Aspects 16 to 29, wherein the one or more processors are configured to: train, for one or more training iterations, the neural network system using a loss function, the loss function determining a loss between one or more reconstructed B-frames and one or more frames represented by the one or more reconstructed B-frames.

Aspect 31: The apparatus of any of Aspects 16 to 30, wherein the apparatus comprises a mobile device.

Aspect 32: The apparatus of any of Aspects 16 to 31, wherein the apparatus comprises an extended reality device.

Aspect 33: The apparatus of any of Aspects 16 to 32, wherein the apparatus comprises a camera configured to capture one or more video frames.

Aspect 34: The apparatus of any of Aspects 16 to 33, wherein the apparatus comprises a display configured to display one or more video frames.

Aspect 35: A non-transitory computer-readable medium having stored thereon instructions which, when executed by one or more processors, cause the one or more processors to perform operations according to any of Aspects 1 to 34.

Aspect 36: An apparatus comprising means for performing operations according to any of Aspects 1 to 34.

What is claimed is:

1. An apparatus comprising:
    memory; and
    one or more processors coupled to the memory and configured to:
        receive, from an encoder portion of a neural network system, a residual associated with a frame of a current processing time step;
        determine first motion information for a first reference frame associated with a first processing time step and second motion information for a second reference frame associated with a second processing time step, wherein the current processing time step is after the first processing time step and before the second processing time step;
        determine, using a decoder portion of the neural network system, third motion information for the frame based on the first motion information of the first reference frame and the second motion information of the second reference frame;

generate, using the decoder portion of the neural network system, a predicted frame based on the third motion information of the frame, the first reference frame and the second reference frame; and generate, using the predicted frame and the residual, a reconstructed bidirectional predicted frame (B-frame) for the current processing time step, the reconstructed B-frame representing the frame,
wherein the first motion information comprises a first two-dimensional (2D) optical flow map calculated from the current processing time step to the first reference frame, wherein the second motion information comprises a second 2D optical flow map calculated from the current processing time step to the second reference frame, and wherein the third motion information comprises a three-dimensional (3D) optical flow map generated based on the first 2D optical flow map and the second optical flow map.

2. The apparatus of claim 1, wherein the first 2D optical flow map and the second 2D optical flow map comprises spatial dimensions indicating vertical and horizontal displacements, and wherein the 3D optical flow map comprises spatial dimensions indicating estimated vertical and horizontal displacements and a frame dimension mapping each of the estimated vertical and horizontal displacements in the spatial dimensions to a corresponding one of the first reference frame and the second reference frame.

3. The apparatus of claim 1, wherein the one or more processors are configured to: determine, using the decoder portion of the neural network system, forward motion information from the first reference frame to the second reference frame, and backward motion information from the second reference frame to the first reference frame; determine, using the decoder portion of the neural network system, the first 2D optical flow map based on the forward motion information and a value of an interval of the first processing time step and the second processing time step, the value of the interval corresponding to the current processing time step; and determine, using the decoder portion of the neural network system, the second 2D optical flow map based on the backward motion information and the value of the interval.

4. The apparatus of claim 1, wherein the one of more processes are configured to: warp, using the 3D optical flow map, the first reference frame and the second reference frame to the current processing time step, wherein the predicted frame is generated based on the 3D optical flow map, the warped first reference frame and the warped second reference frame.

5. The apparatus of claim 4, wherein the one or more processors are configured to:
adjust one or more motion values in at least one of the first 2D optical flow map and the second 2D optical flow map based on a detected non-linearity in the one or more motion values; and
after adjusting the one or more values in at least one of the first 2D optical flow map and the second 2D optical flow map, merge the first 2D optical flow map and the second 2D optical flow map into the 3D optical flow map.

6. The apparatus of claim 5, wherein the one or more processors are configured to:
receive, from the encoder portion of the neural network system, an encoded bitstream comprising the residual and contextual information extracted from image data associated with at least one of the frame, the first reference frame and the second reference frame;
decode, using the decoder portion of the neural network system, the encoded bitstream; and
adjust the one or more values in at least one of the first 2D optical flow map and the second 2D optical flow map, the one or more values being adjusted further based on the contextual information, the contextual information comprising at least one of an occlusion in the image data, one or more edges in the image data, and one or more features in the image data.

7. The apparatus of claim 1, wherein the one or more processors are configured to: warp, using the first 2D optical flow map, the first reference frame to the current processing time step; and warp, using the second 2D optical flow map, the second reference frame to the current processing time step, wherein the 3D optical flow map is generated based on at least one of the first reference frame, the second reference frame, the warped first reference frame, the warped second reference frame, the first 2D optical flow map, and the second optical flow map.

8. The apparatus of claim 1, wherein the first reference frame and the second reference frame comprise at least one of an intra-coded frame (I-frame) and an additional B-frame.

9. The apparatus of claim 1, wherein the one or more processors are configured to:
receive, from the encoder portion of the neural network system, an encoded bitstream comprising the residual; and
decode, using the decoder portion of the neural network system, the encoded bitstream.

10. The apparatus of claim 1, wherein the one or more processors are configured to:
generate, using the decoder portion of the neural network system, the predicted frame and the reconstructed B-frame without the frame and without motion information from the encoder portion of the neural network system.

11. The apparatus of claim 1, wherein the one or more processors are configured to:
determine, using the encoder portion of the neural network system, the first motion information for the first reference frame and the second motion information for the second reference frame;
determine, using the encoder portion of the neural network system, the third motion information for the frame based on the first motion information of the first reference frame and the second motion information of the second reference frame; and
generate, using the encoder portion of the neural network system, the predicted frame based on the third motion information of the frame, the first reference frame and the second reference frame.

12. The apparatus of claim 11, wherein the one or more processors are configured to:
generate, using the encoder portion of the neural network system, the residual based on the predicted frame and the frame;
generate, using the encoder portion of the neural network system, an encoded bitstream comprising the residual; and
transmit, using the encoder portion of the neural network system, the encoded bitstream to the decoder portion of the neural network system.

13. The apparatus of claim 12, wherein the one or more processors are configured to:

determine, using the encoder portion of the neural network system, contextual information extracted from image data associated with at least one of the frame, the first reference frame and the second reference frame, wherein the encoded bitstream further comprises the contextual information.

14. The apparatus of claim 1, wherein the one or more processors are configured to:
train, for one or more training iterations, the neural network system using a loss function, the loss function determining a loss between one or more reconstructed B-frames and one or more frames represented by the one or more reconstructed B-frames.

15. The apparatus of claim 1, wherein the apparatus comprises a mobile device.

16. The apparatus of claim 1, wherein the apparatus comprises an extended reality device.

17. The apparatus of claim 1, wherein the apparatus comprises camera configured to capture one or more video frames.

18. A method comprising:
receiving, from an encoder portion of a neural network system, a residual associated with a frame of a current processing time step;
determining first motion information for a first reference frame associated with a first processing time step and second motion information for a second reference frame associated with a second processing time step, wherein the current processing time step is after the first processing time step and before the second processing time step;
determining, using a decoder portion of the neural network system, third motion information for the frame based on the first motion information of the first reference frame and the second motion information of the second reference frame; generating, using the decoder portion of the neural network system, a predicted frame based on the third motion information of the frame, the first reference frame and the second reference frame;
and generating, using the predicted frame and the residual, a reconstructed bidirectional predicted frame (B-frame) for the current processing time step, wherein the reconstructed B-frame representing the frame, wherein the first motion information comprises a first two-dimensional (2D) optical flow map calculated from the current processing time step to the first to the first reference frame, wherein the second motion information comprises a second 2D optical flow map calculated from the current processing time step to the second reference frame, and wherein the third motion information comprises a three-dimensional (3D) optical flow map generated based on the first 2D optical flow map and the second 2D optical flow map.

19. The method of claim 18, wherein the first 2D optical flow map and the second 2D optical flow map comprise spatial dimensions indicating vertical and horizontal displacements, and wherein the 3D optical flow map comprises spatial dimensions indicating estimated vertical and horizontal displacements and a frame dimension mapping each of the estimated vertical and horizontal displacements in the spatial dimensions to a corresponding one of the first reference frame and the second reference frame.

20. The method of claim 18, further comprising: determining, using the decoder portion of the neural network system, forward motion information from the first reference frame to the second reference frame, and backward motion information from the second reference frame to the first reference frame; determining, using the decoder portion of the neural network system, the first 2D optical flow map based on the forward motion information and a value of an interval of the first processing time step and the second processing time step, the value of the interval corresponding to the current processing time step; and determining, using the decoder portion of the neural network system, the second 2D optical flow map based on the backward motion information and the value of the interval.

21. The method of claim 18, further comprising: warping, using the 3D optical flow map, the first reference frame and the second reference frame to the current processing time step, wherein the predicted frame is generated based on the 3D optical flow map, the warped first reference frame and the warped second reference frame.

22. The method of claim 21, further comprising:
adjusting one or more motion values in at least one of the first 2D optical flow map and the second 2D optical flow map based on a detected non-linearity in the one or more motion values; and
after adjusting the one or more values in at least one of the first 2D optical flow map and the second 2D optical flow map, merging the first 2D optical flow map and the second 2D optical flow map into the 3D optical flow map.

23. The method of claim 22, further comprising:
receiving, from the encoder portion of the neural network system, an encoded bitstream comprising the residual and contextual information extracted from image data associated with at least one of the frame, the first reference frame and the second reference frame;
decoding, using the decoder portion of the neural network system, the encoded bitstream; and
adjusting the one or more values in at least one of the first 2D optical flow map and the second 2D optical flow map, the one or more values being adjusted further based on the contextual information, the contextual information comprising at least one of an occlusion in the image data, one or more edges in the image data, and one or more features in the image data.

24. The method of claim 18, further comprising: warping, using the first 2D optical flow map, the first reference frame to the current processing time step; and warping, using the second 2D optical flow map, the second reference frame to the current processing time step, wherein the 3D optical flow map is generated based on at least one of the first reference frame, the second reference frame, the warped first reference frame, the warped second reference frame, the first 2D optical flow map, and the second optical flow map.

25. The method of claim 18, further comprising:
generating, using the decoder portion of the neural network system, the predicted frame and the reconstructed B-frame without the frame and without motion information from the encoder portion of the neural network system.

26. The method of claim 18, further comprising:
determining, using the encoder portion of the neural network system, the first motion information for the first reference frame and the second motion information for the second reference frame;
determining, using the encoder portion of the neural network system, the third motion information for the frame based on the first motion information of the first reference frame and the second motion information of the second reference frame; and generating, using the encoder portion of the neural network system, the predicted frame based on the third motion information of the frame, the first reference frame and the second reference frame.

27. The method of claim 26, further comprising:
generating, using the encoder portion of the neural network system, the residual based on the predicted frame and the frame;
generating, using the encoder portion of the neural network system, an encoded bitstream comprising the residual; and
transmitting, using the encoder portion of the neural network system, the encoded bitstream to the decoder portion of the neural network system.

28. A non-transitory computer-readable medium having stored thereon instructions which, when executed by one or more processors, cause the one or more processors to:
receive, from an encoder portion of a neural network system, a residual associated with a frame of a current processing time step;
determine first motion information for a first reference frame associated with a first processing time step and second motion information for a second reference frame associated with
a second processing time step, wherein the current processing time step is after the first processing time step and before the second processing time step; determine, using a decoder portion of the neural network system, third motion information for the frame based on the first motion information of the first reference frame and the second motion information of the second reference frame;
generate, using the decoder portion of the neural network system, a predicted frame based on the third motion information of the frame, the first reference frame and the second reference
frame; and generate, using the predicted frame and the residual, a reconstructed bidirectional predicted frame (B-frame) for the current processing time step, the reconstructed B-frame representing the frame; wherein the first motion information comprises a first two-dimensional (2D) optical flow map calculated from the current processing time step to the first reference frame, wherein the second motion information comprises a second 2D optical flow map calculated from the current processing time step to the second reference frame, and wherein the third motion information comprises a three-dimensional (3D) optical flow map generated based on the first 2D optical flow map and the second optical flow map.

* * * * *